(12) United States Patent
Gao et al.

(10) Patent No.: US 12,122,088 B2
(45) Date of Patent: Oct. 22, 2024

(54) METHOD FOR PROCESSING COMPONENTS WITH HIGH STANDARD OF CLEANLINESS, AND PRODUCTION LINE APPLYING THE METHOD

(71) Applicant: Fulian Yuzhan Precision Technology Co., Ltd, Shenzhen (CN)

(72) Inventors: Jian-Wen Gao, Shenzhen (CN); Ting-Ting Li, Shenzhen (CN); Chu-Hui Wu, Shenzhen (CN); Ai-Jun Tang, Shenzhen (CN); Hui Wang, Shenzhen (CN); Shi Chen, Shenzhen (CN); Bo Yang, Shenzhen (CN); Feng Zhang, Shenzhen (CN); Kun-Liang Lin, Shenzhen (CN); Jian-Gang Zhang, Shenzhen (CN)

(73) Assignee: Fulian Yuzhan Precision Technology Co., Ltd, Shenzhen (CN)

( * ) Notice: Subject to any disclaimer, the term of this patent is extended or adjusted under 35 U.S.C. 154(b) by 0 days.

(21) Appl. No.: 17/687,922

(22) Filed: Mar. 7, 2022

(65) Prior Publication Data

US 2022/0288841 A1    Sep. 15, 2022

(30) Foreign Application Priority Data

Mar. 12, 2021    (CN) .......................... 202110269840.8
Mar. 12, 2021    (CN) .......................... 202110269841.2

(51) Int. Cl.
*B29C 63/48*    (2006.01)
*B29C 63/00*    (2006.01)
(Continued)

(52) U.S. Cl.
CPC ........ *B29C 63/481* (2013.01); *B29C 63/0004* (2013.01); *B29C 63/0065* (2013.01);
(Continued)

(58) Field of Classification Search
CPC .......... B29C 2063/0008; B29C 63/024; B29C 63/02; B29C 65/00; B29C 65/02;
(Continued)

(56) References Cited

FOREIGN PATENT DOCUMENTS

| CN | 104001696 A | 8/2014 |
|---|---|---|
| CN | 105170495 A | 12/2015 |

(Continued)

OTHER PUBLICATIONS

Translation TW 201106676A1 (Year: 2011).*
Translation CN110303674B. (Year: 2020).*

*Primary Examiner* — George R Koch
*Assistant Examiner* — Jimmy R Smith, Jr.
(74) *Attorney, Agent, or Firm* — ScienBiziP, P.C.

(57) ABSTRACT

A production line for producing components to a high standard of cleanliness and sealed and protected in that state includes a loading device, a cleaning device, a detecting device, a pasting device, a heat-sealing device, a packing device, and transfer devices of the production line. The production line automatically processes the components for obtaining components with the high cleanliness. By the processes of protective film pasting, heat-sealing, and packing, the components may be further protected from subsequent pollution. A method for producing components with a high cleanliness applied to the production line is also disclosed.

8 Claims, 35 Drawing Sheets

(51) Int. Cl.
*B29C 63/02* (2006.01)
*B29L 11/00* (2006.01)

(52) U.S. Cl.
CPC .... *B29C 63/024* (2013.01); *B29C 2063/0008* (2013.01); *B29C 2063/483* (2013.01); *B29L 2011/0016* (2013.01)

(58) Field of Classification Search
CPC . B29C 65/18; B29C 63/006; B29C 2063/483; B29C 63/0004; B29C 63/0065; B29C 63/481; B29L 2011/0016; B29L 2011/00; B29L 2011/0058
See application file for complete search history.

(56) References Cited

FOREIGN PATENT DOCUMENTS

| | | | | |
|---|---|---|---|---|
| CN | 109353579 A | | 2/2019 | |
| CN | 110000159 A | | 7/2019 | |
| CN | 110076140 A | | 8/2019 | |
| CN | 110303674 B | * | 9/2020 | ............. B08B 1/006 |
| TW | 201106676 A | * | 2/2011 | ........... H04N 1/0282 |
| WO | WO-0191994 A1 | * | 12/2001 | ............. B29D 11/00 |

* cited by examiner

METHOD FOR PROCESSING COMPONENTS WITH HIGH STANDARD OF CLEANLINESS, AND PRODUCTION LINE APPLYING THE METHOD

This application claims all benefits accruing under 35 U.S.C. § 119 from Chinese Patent Application No. 202110269840.8, filed on Mar. 12, 2021 and No. 202110269841.2, filed on Mar. 12, 2021 in the State Intellectual Property Office of China, the entire contents of which are incorporated herein by reference.

FIELD

The subject matter herein generally relates to component production field, specifically relates to a method for producing components with a high standard of cleanliness and a production line applying the method.

BACKGROUND

Components are processed in different ways for achieving the components in a desired state. A cleaning process is important for removing impurities on the surface of the components.

The normal cleaning process may be a manual cleaning process, an ultrasonic cleaning process, or a water cleaning process. A cleanliness of the component may be insufficient due to residues remaining on the surface of the component and a cleaned component which has unprotected surfaces may in any event be polluted before a next process. The component without such protection may not be able to meet a production requirement. Further, a processing efficiency is low.

There is room for improvement in the art.

BRIEF DESCRIPTION OF THE FIGURES

Implementations of the present disclosure will now be described, by way of example only, with reference to the attached figures.

DETAILED DESCRIPTION

Figure 1:
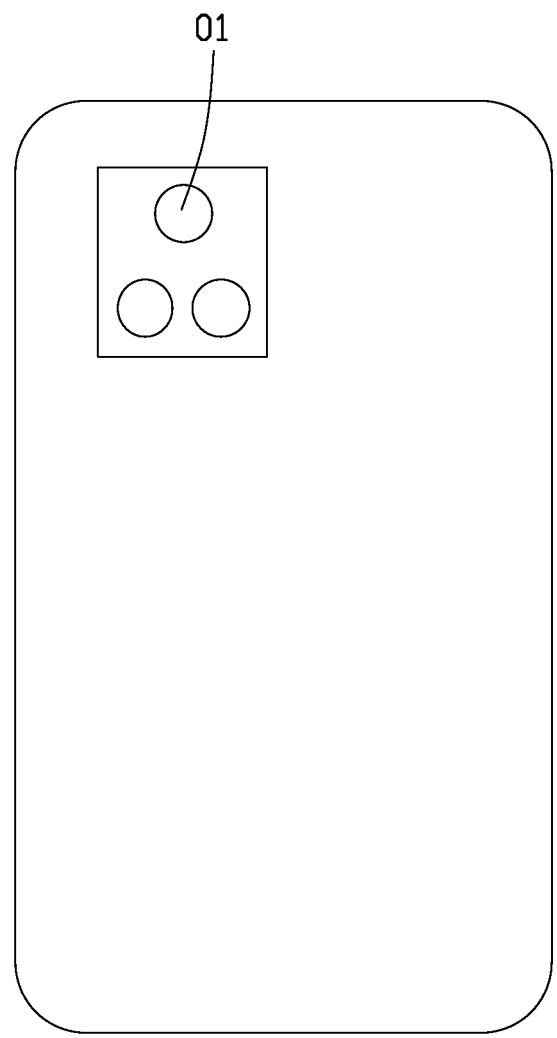
FIG. 1 is a diagram illustrating an embodiment of a component according to the present disclosure.

The present disclosure is described with reference to accompanying drawings and the embodiments. It will be understood that the specific embodiments described herein are merely part of all embodiments, not all the embodiments. Based on the embodiments of the present disclosure, it is understandable to a person skilled in the art, any other embodiments obtained by persons skilled in the art without creative effort shall all fall into the scope of the present disclosure.

The relationships of orientations or positions denoted by the terms of terms "center", "longitudinal", "lateral", "length", "width", "thickness", "up", "down", "left", "right", "horizontal", "left", "top", "bottom", "inside", "outside", "clockwise", "anticlockwise" used herein refer to those illustrated in the accompany drawings, which are only for conveniently describing the invention and simplifying the description, rather than indicating or implying that a device or member has to be in a specific orientation or configured or operated in a specific orientation. In addition, the terms of "first" and "second" are for the purpose of describing only and should not be constructed to indicate or imply the relative importance. In the present disclosure, the term of "some" means two or more than two, unless otherwise expressly stated.

In the present disclosure, unless otherwise expressly stated, the terms "mounted", "link", and "connect" should be understood broadly, unless otherwise specified and defined, for example, they may be a fixed connection or a removable connection, they may be a mechanical connection or electrical connection, and also an inner communication between two members, they may directly connect, and also indirectly connect via a medium, the skilled persons in the art understand the meanings of above terms according to specific situations.

In the present disclosure, unless otherwise expressly stated, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed there between. Furthermore, a first feature "on," "above," or "on top of" a second feature may include an embodiment in which the first feature is right or obliquely "on," "above," or "on top of" the second feature, or may just mean that the first feature is at a height higher than that of the second feature; while a first feature "below," "under," or "on bottom of" a second feature may include an embodiment in which the first feature is right or obliquely "below," "under," or "on bottom of" the second feature, or may just mean that the first feature is at a height lower than that of the second feature.

Different examples for the implementation of the different structures are given in this application. To simplify the application, components and settings for a specific example are described. Nevertheless, the components and settings are only for demonstration purpose, not to be considered as restrictions to this application. Furthermore, the reference number and/or letter in this application may be repetitively used in different examples. It aims to simplify and clarify the application, with no intention on indicating the relationship between different examples and/or settings. In addition, this application provides examples of several different specific technology and material, which can be extended to implementations on other technology and/or material by the technical staff within the same field.

Components, especially electronic components, need to be processed to be in a desired state. Surfaces of the components need to be cleaned for obtaining clean components. For example, while manufacturing an electronic product, some components 00 in the electronic productor need processing to clean the surfaces of the components 00, and a quality of components 00 is improved based on the cleaned surfaces. Performance of the electronic productor with the components 00 is also improved. For example, a cleanliness of a lens in the electronic productor effects a sharpness of images or videos captured by the electronic productor. While manufacturing the electronic productor, a cleaning process of the lens is important for ensuring effective image-capturing by a camera, and a protection of the cleaned lens should be provided for preventing the cleaned lens from losing its cleanliness.

Figure 2A:
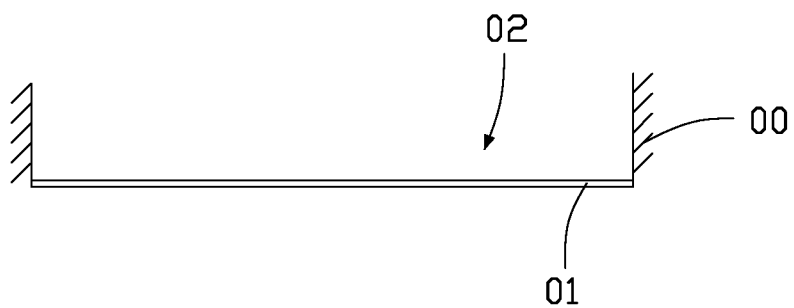
FIGS. 2A-2B are diagrams illustrating different embodiments of different convex structures according to the present disclosure.
Figure 2B:
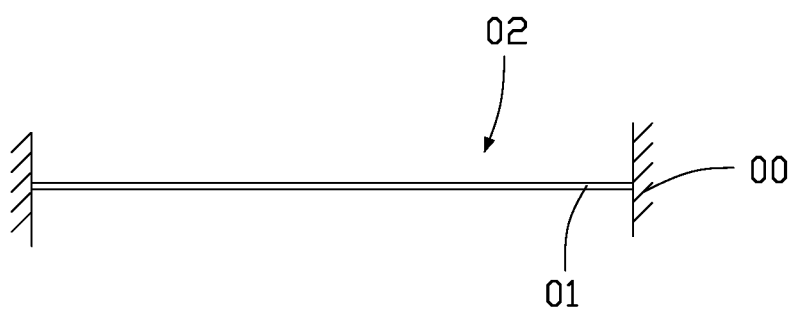

FIG. 1 illustrates a component 00 with lenses 01. While manufacturing an electronic productor, the lenses 01 in the component 00 need to be processed. In some embodiments, the number of lenses 01 may be three. In other embodiments, the number of the lenses 01 may be less or more. In some embodiments, as shown in FIG. 2A, the lenses 01 may be disposed in a convex construction 02 in a rear of the component 00. The convex construction 02 makes a cleaning efficiency problematic, and a process for cleaning the lenses 01 received in the convex construction 02 is more complex and harder. A normal cleaning manner is unable to completely clean the lenses 01. In some embodiments, as shown in FIG. 2B, there may be two convex constructions 02 on opposite surfaces of each lens 01. In some embodiments, beside the cleaning process of the lenses 01, precautions may need to be taken in relation to the cleaned lens 01.

Figure 3:
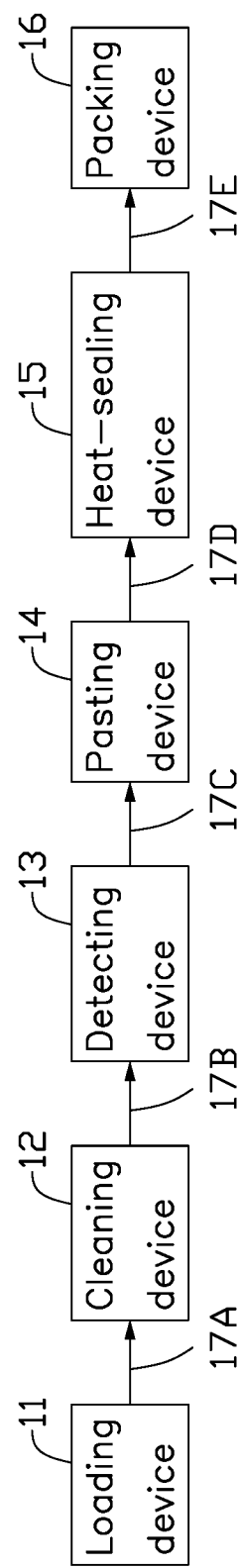
FIG. 3 is a diagram illustrating a first embodiment of a production line according to the present disclosure.

FIG. 3 illustrates a production line 10 for processing the component 00 with the lenses 01. The production line 10 is used for automatically cleaning the component 00, the processes of the production line 10 include loading a component, cleaning and detecting the component, sealing the component, and the like. The component may be the lens 01 of the component 00. The production line 10 may include a loading device 11, a cleaning device 12, a detecting device 13, a pasting device 14, a heat-sealing device 15, a packing device 16, and transfer devices 17A-17E. The transfer devices 17A-17E carry the component 00 among two of the loading device 11, the cleaning device 12, the detecting device 13, the pasting device 14, the heat-sealing device 15, and the packing device 16. In some embodiments, the transfer devices 17 work automatically in transferring the lens 01 among two of the loading device 11, the cleaning device 12, the detecting device 13, the pasting device 14, the heat-sealing device 15, and the packing device 16. The loading device 11 picks up a waiting lens 01 from a delivery plate for loading the lens 01 on the production line 10, which will be processed by subsequent devices. The transfer device 17A transfers the lens 01 to the cleaning device 12 for cleaning the lens 01. The transfer device 17B transfers the cleaned lens 01 to the detecting device 13 for analysis. The detecting device 13 investigates the lens 01 and determines whether the lens 01 satisfies a cleaning standard. The transfer device 17C transfers the lens 01 meeting the cleaning standard to the pasting device 14 for pasting a protection film. The transfer device 17D transfers the lens 01 to the heat-sealing device 15 for sealing an anti-static film. The transfer device 17E transfers the lens 01 with the heat-sealed anti-static film to the packing device 16 for packing, thus protective processes of the lens 01 may be complete.

Figure 4:
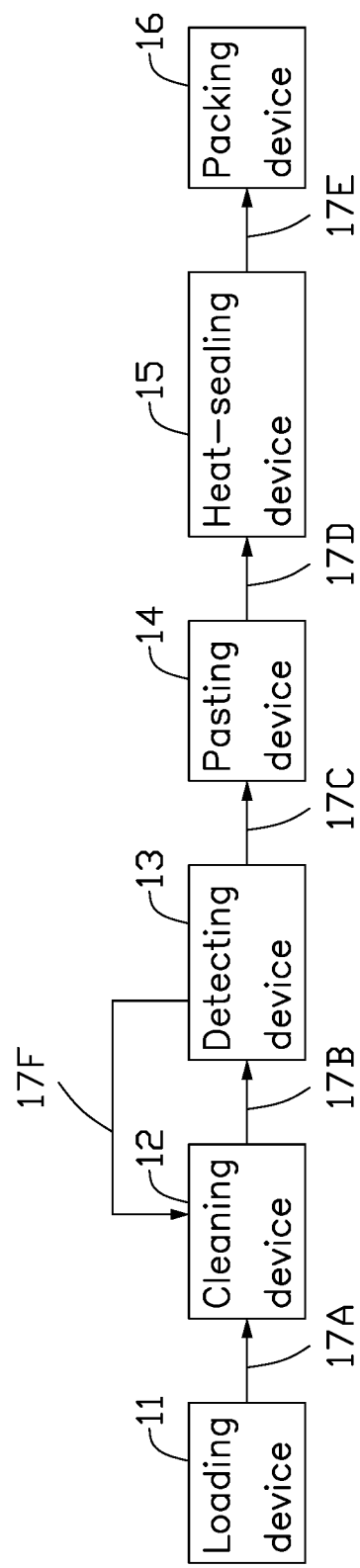
FIG. 4 is a diagram illustrating a second embodiment of a production line according to the present disclosure.

In some embodiments, the lens 01 not meeting the cleanliness standard ("unclean lens 01") may be collected by the detecting device 13, to avoid being instantly transferred to the pasting device 14 by the transfer device 17C. In some embodiments, the unclean lens 01 also may be transferred to the cleaning device 12 for re-cleaning by a transfer device 17F. As shown in FIG. 4, the transfer device 17F moves between the cleaning device 12 and the detecting device 13 for transferring the lens 01 from the detecting device 13 to the cleaning device 12. In some embodiments, the processes of the lenses 01 for loading, cleaning, detecting, film pasting, heat-sealing, and packing may be automatically executed, and the lens 01 will be under three layers of cleanliness protection.

In one embodiment, the loading device 11, the cleaning device 12, the detecting device 13, the pasting device 14, the heat-sealing device 15, and the packing device 16 of the production line 10 may be set in a functional modular manner, which are connected by the transfer devices 17A-17E. A modular casing decreases the presence of dust etc. as a pollutant, a cleaning effect in the whole processes is improved. While the processes in the production line 10, the lens 01 may be transferred by the transfer devices 17A-17E between different devices for automatic processing.

Figure 5:
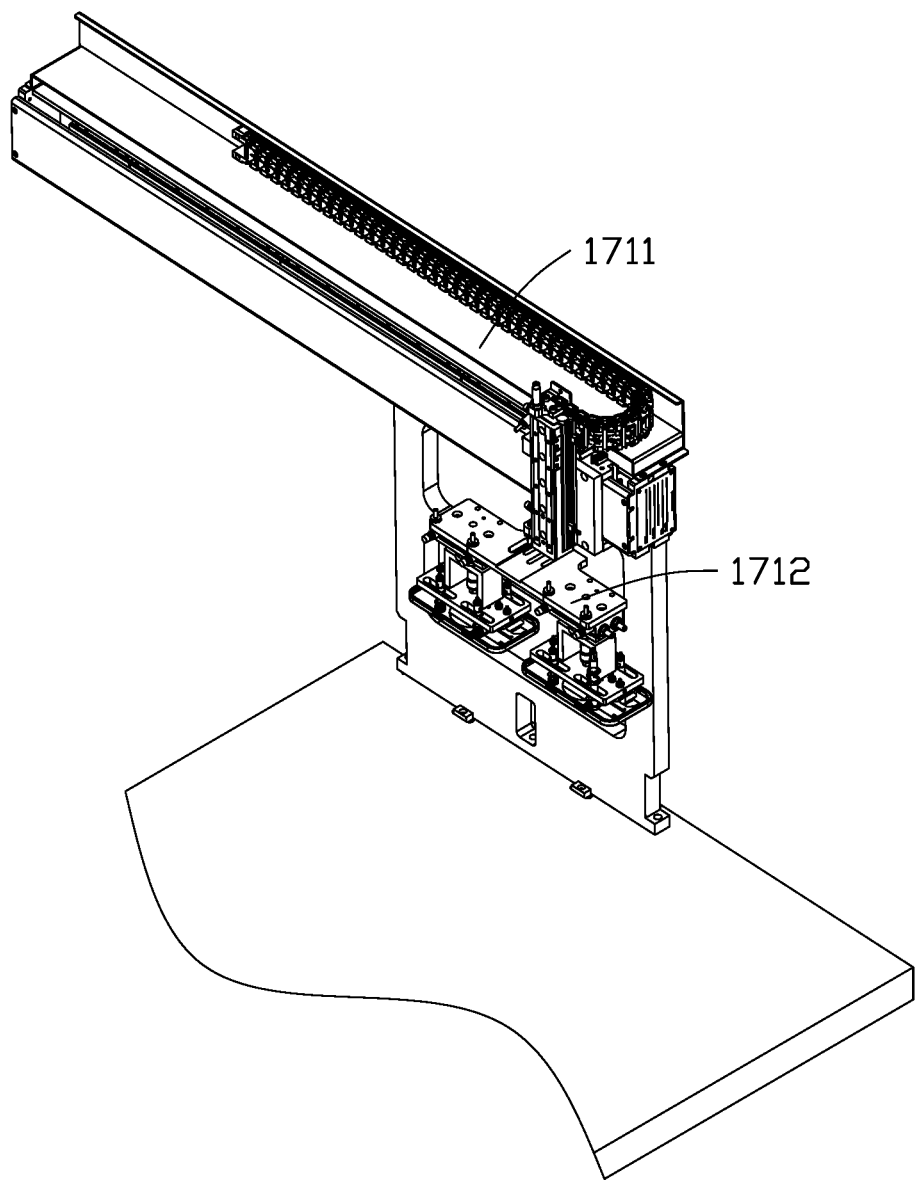
FIG. 5 is a diagram illustrating an embodiment of a transfer mechanism in a transfer device of a production line according to the present disclosure.

As shown in FIG. 5, the transfer devices 17A-17E may be transfer mechanisms 171. Each transfer mechanism 171 may include a first guide rail 1711 and mechanism arms 1712. The first guide rail 1711 may be disposed between the loading device 11, the cleaning device 12, the detecting device 13, the pasting device 14, the heat-sealing device 15, and the packing device 16. The mechanism arms 1712 may be disposed on the first guide rail 1711 for taking hold of the lenses 01 and may be capable of moving in the first guide rail 1711 for transferring the lens 01 for subsequent processing.

Figure 6:
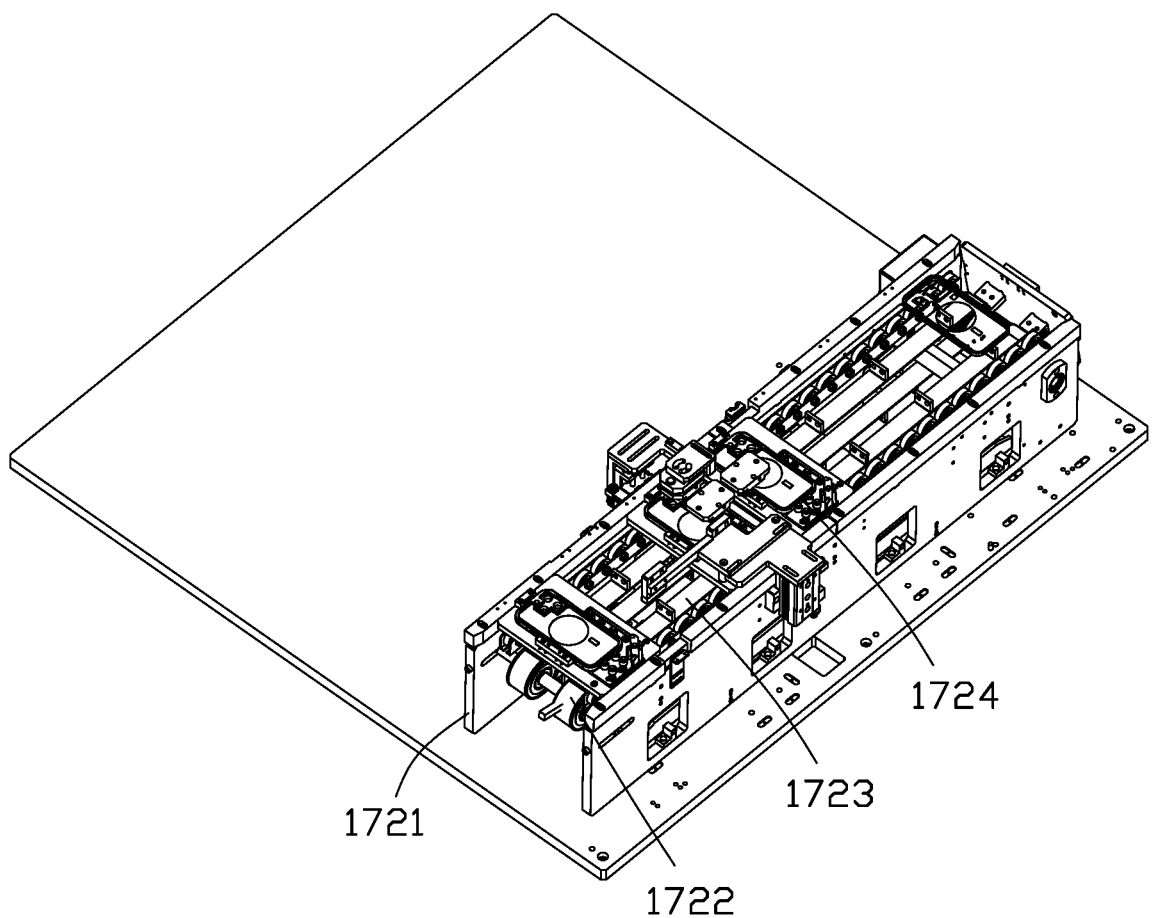
FIG. 6 is a diagram illustrating an embodiment of a chain plate line of the transfer mechanism in FIG. 5 according to the present disclosure.

As shown in FIG. 6, in some embodiments, the transfer devices 17A-17E may include a chain plate line 172. The chain plate line 172 may be disposed on the loading device 11, the cleaning device 12, the detecting device 13, the pasting device 14, the heat-sealing device 15, and the packing device 16 for transferring the lens 01. In some embodiments, the chain plate line 172 may also selectively disposed on one or more of the loading device 11, the cleaning device 12, the detecting device 13, the pasting device 14, the heat-sealing device 15, and the packing device 16 due to a requirement for transferring lens 01.

The chain plate line 172 may include a first frame 1721, a driving wheel 1722, a chain 1723, and a first load platform 1724. The first frame 1721 may be disposed on platforms of each device. The driving wheel 1722, the chain 1723, and the first load platform 1724 may be disposed on the first frame 1721. In detail, the chain 1723 may be sleeved on the driving wheel 1722 and may be moved by the driving wheel 1722. The first load platform 1724 loads the lens 01 and may be moved by the moving chain 1723. The chain plate line 172 may drive the lens 01 to move on each device and halt the lens 01 at each device. Due to the processes of the production line 10, a number of the first load platforms 1724 and a number of the lenses 01 may be adjusted for improving a production efficiency. In some embodiments, a number of the chains 1723 may be two for steady transference of the lens 01. In some embodiments, a transfer mechanism 171 between any two devices may be disposed on the chain plate lines 172 of two devices. The mechanism arms 1712 of the transfer mechanism 171 may pick up the lens 01 on the chain plate line 172 of a previous device. The mechanism arms 1712 with the picked lens 01 transfer the lens 01 to a next device along the first guide rail 1711 of the transfer mechanism 171 and put the picked lens 01 on the chain plate line 172 of the next device for transferring the lens 01 between two devices. The lens 01 may be disposed in the component 00. The transfer devices 17A-17E of the present disclosure transfer the component 00 for transferring the lens 01 between the devices.

Figure 7:
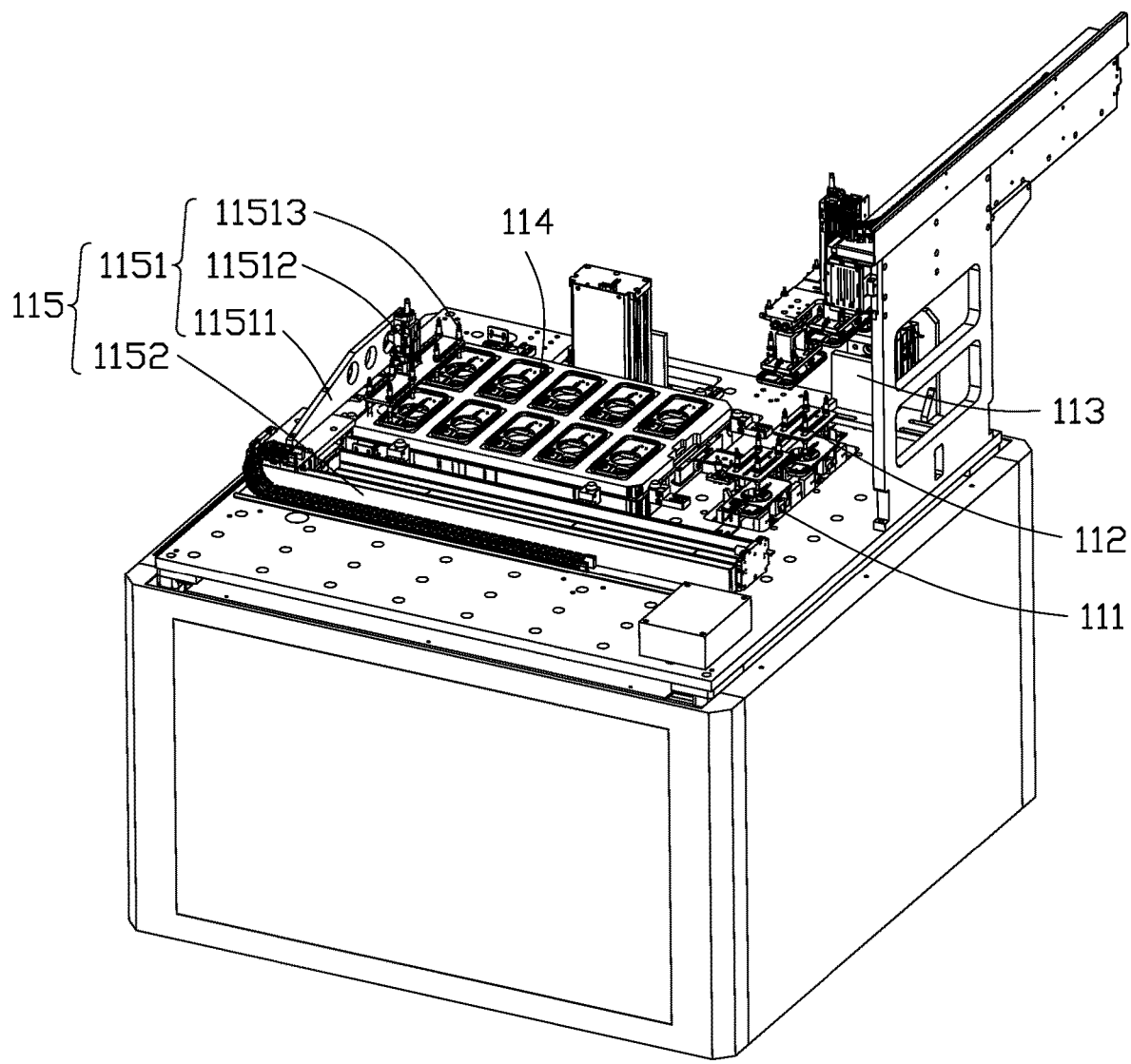
FIG. 7 is a diagram illustrating an embodiment of a loading device of a production line according to the present disclosure.

As shown in FIG. 7, in one embodiment, the loading device 11 includes a locating member 111, an adsorbing member 112, and a rotating member 113, which cooperate with each other to load the lens 01.

In one embodiment, the lens 01 may be disposed in the component 00, the loading device 11 loads the component 00 with the lens 01. In detail, the locating member 111 locates the component 00, the adsorbing member 112 adsorbs the located component 00, and the rotating member 113 rotates the adsorbed component 00 for turning over the component 00. The operation of turning over may be used for exposing a to-be-processed surface of the component 00, which is necessary to a specified component 00, for example, an opposite surface of the component 00 needs to be processed. For example, when a cleaning direction of the cleaning device 12 is an upwards direction, the component 00 needs to be turned over. In some embodiments, the locating member 111 may be clamped in directions X and Y for locating the component 00 along the directions X and Y.

In some embodiments, as shown in FIG. 7, the loading device 11 also include a component supply mechanism with a feeding plate 114 and a picking mechanism 115. The feeding plate 114 may be disposed adjacent to the locating member 111. The picking mechanism 115 disposed between the locating member 111 and the feeding plate 114 picks up the component 00 in the feeding plate 114 and transfers same to the locating member 111. In detail, the picking mechanism 115 includes picking mechanism arms 1151 and a second guide rail 1152. The picking mechanism arms 1151 may be disposed on the second guide rail 1151. The second guide rail 1152 may be disposed on a platform of the loading device 11. The picking mechanism arms 1151 may move along the second guide rail 1152 for transferring the picked component 00 to be upon the locating member 111. Each picking mechanism arm 1151 may include a supporting frame 11511, a first lift cylinder 11512, and adsorbing units 11513. The adsorbing units 11513 may be disposed on the first lift cylinder 11512. The first lift cylinder 11512 may be disposed on the supporting frame 11511. The supporting frame 11511 may be disposed on the second guide rail 1152 and moves along the second guide rail 1152. The adsorbing units 11513 may be disposed upon the feeding plate 114 and lift up/drop down according to the first lift cylinder 11512. When the adsorbing unit 11513 drops down upon the component 00 in the feeding plate 114, the adsorbing unit 11513 adsorbs the component 00. Then, the first lift cylinder 11512 lifts up and the supporting frame 11511 moves in the second guide rail 1152 for transferring the component 00 being adsorbed by the adsorbing unit 11513 to be upon the locating member 111. Then, the first lift cylinder 11512 drops down for disposing the component 00 at the locating member 111, thus the operation of feeding is complete.

Figure 8:
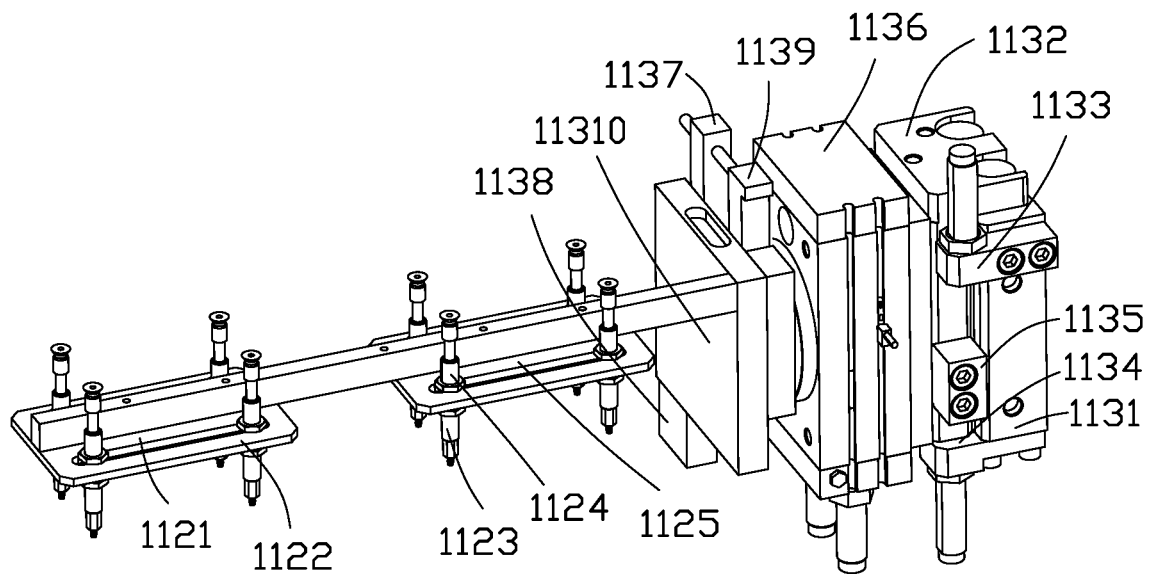
FIG. 8 is a diagram illustrating an embodiment of part of mechanism of the loading device of FIG. 7 according to the present disclosure.

As shown in FIG. 8, the adsorbing member 112 includes a supporting rod 1121, a supporting plate 1122, nozzles 1123, and a fixing member 1124. The supporting plate 1122 may be disposed on the supporting rod 1121. The supporting plate 1122 defines two rectangular slots 1125. The rectangular slots 1125 may be symmetrically disposed on opposite sides of the supporting rod 1121. The nozzles 1123 may be disposed in the rectangular slots 1125 by the fixing member 1124. A height of each nozzle 1123 on the corresponding rectangular slot 1125 is adjustable. The nozzles 1123 may be fixed by the fixing member 1124. The nozzles 1123 may be connected with an external air source (not shown). In some embodiments, for firmly adsorbing the component 00, the number of the nozzles 1123 may be four. Two of the nozzles 1123 may be disposed on opposite ends of one rectangular slot 1125, and another two of the nozzles 1123 may be disposed on opposite ends of other rectangular slot 1125. Thus, the component 00 may be firmly adsorbed along four directions.

In some embodiment, for improving an efficiency of turning over the component 00, there may be two or more supporting plates 1122 disposed on the supporting rod 1121. The structures of the nozzles 1123 on the two or more supporting plates 1122 may be same or different. In some embodiments, the fixing member 1124 may be a nut for fixing the nozzles 1123 on the corresponding supporting plate 1122 based on the adjusted height. The rotating member 113 includes a second lift cylinder 1131, a sliding block 1132, a first sensing switch 1133, a second sensing switch 1134, a first sensing block 1135, a rotating cylinder 1136, a third sensing switch 1137, a fourth sensing switch 1138, a second block 1139, and a fixing block 11310. The sliding block 1132 may be disposed on the second lift cylinder 1131 for being lifted up/dropped down. The first sensing switch 1133 and the second sensing switch 1134 may be disposed on the upper and bottom ends of the second lift cylinder 1131 respectively. The first sensing block 1135 may be disposed on the sliding block 1132, the first sensing block 1135 moves with the sliding block 1132 for being sensed by the first sensing switch 1133 and the second sensing switch 1134, thus the operation of moving the sliding block 1132 is controlled. The rotating cylinder 1136 may be disposed on the sliding block 1132 and moves with the sliding block 1132. The third sensing switch 1137 and the fourth sensing switch 1138 may be disposed on upper and bottom ends of the second lift cylinder 1131 respectively. The second sensing block 1139 may be disposed on a rotating output axis of the rotating cylinder 1136. The fixing block 11310 may be fixed on the second sensing block 1139.

The supporting rod 1121 may be fixed on the fixing block 11310. The second sensing block 1139, the fixing block 11310, and the supporting rod 1121 may rotate with the rotating output axis of the rotating cylinder 1136. The second sensing block 1139 may be sensed by the third sensing switch 1137 and the fourth sensing switch 1138. Thus, a rotating angle of the second sensing block 1139, the fixing block 11310, and the supporting rod 1121 may be 180 degree for the supporting rod 1121 to turn over the component 00. In the loading device 11, the surface of the component 00 being turned over is convenient for a next process.

Figure 9:
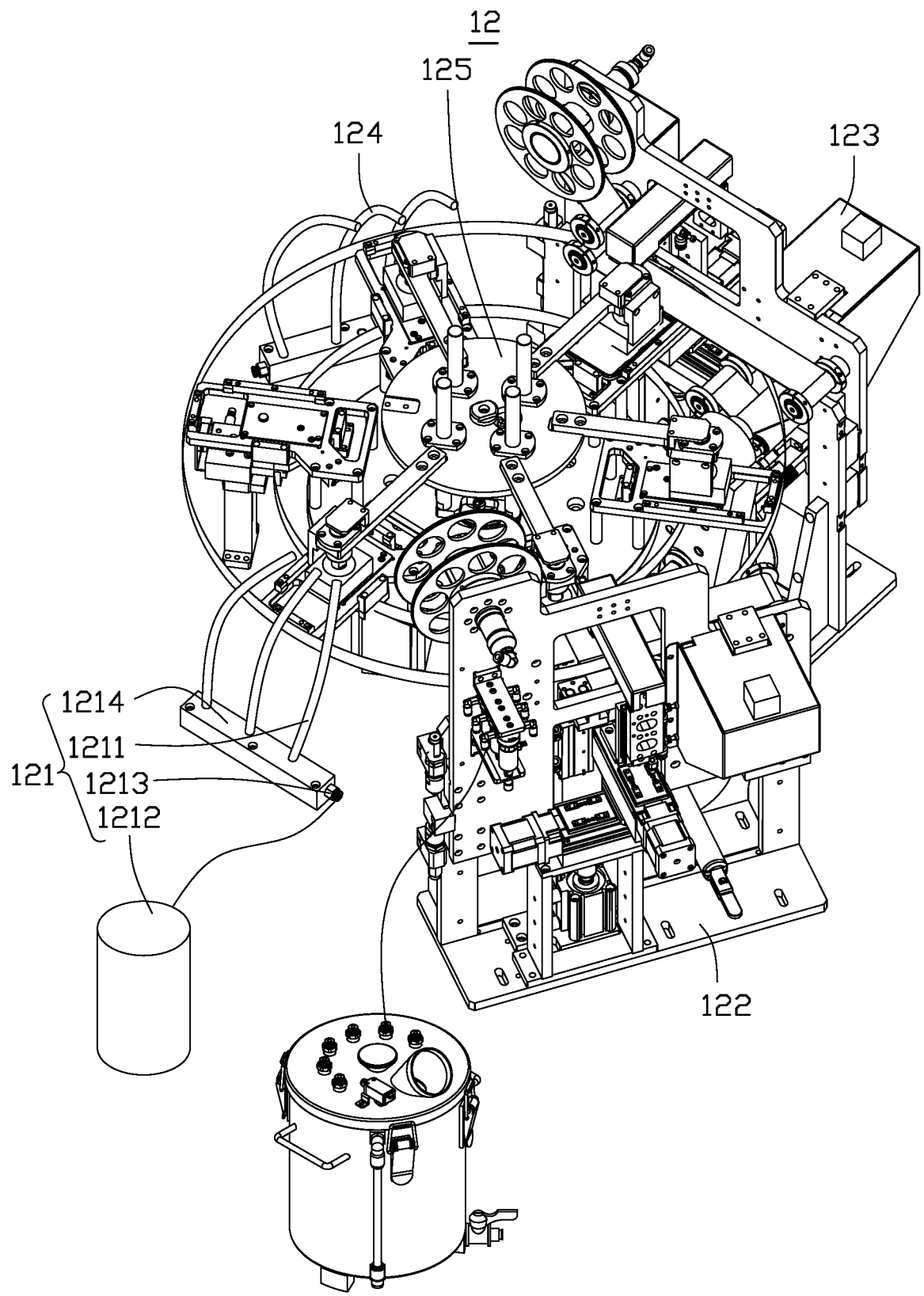
FIG. 9 is a diagram illustrating an embodiment of a cleaning device of a production line according to the present disclosure.

As shown in FIG. 9, in one embodiment, the cleaning device 12 includes a first blowing apparatus 121, a first wiper apparatus 122, a second wiper apparatus 123, and a second blowing apparatus 124. The first blowing apparatus 121 blows air to clean the lens 01 as a first blowing process, which is considered as a first cleaning operation. The first cleaning operation may remove impurities in a larger size or impurities with poor adhesive strength on the lens 01 for avoiding scratches on the lens 01 in a next wiping operation. The first wiper apparatus 122 executes a first wiping process on the lens 01 as a second cleaning operation. The second cleaning operation may remove impurities in a small size or impurities with good adhesive strength on the lens 01. The second wiper apparatus 123 executes a second wiping process on the lens 01 as a third cleaning operation. The third cleaning operation may remove impurities in a smaller size, impurities with a better adhesive strength, and impurities generated after the first wiping operation. The second blowing apparatus 124 blows air onto the lens 01 as a second blowing process, which is considered as a fourth cleaning operation.

The fourth cleaning operation may remove new impurities generated after the second wiping operation or impurities remaining on the surface of the lens 01, which is firmly pasted on the surface of the lens 01 before the first and second wiping operations. The impurities on the surface of the lens 01 may be effectively removed through the first to fourth cleaning operations for achieving a high cleanliness. A cleaning effect of the lens 01 in the convex structure 02 is improved. The operation of cleaning the lens 01 in the convex structure 02 is more complex than the operation of cleaning the lens 01 in a flat structure. The convex structure 02 easily gathers impurities. Due to the first to fourth cleaning operations, the impurities in the convex structure 02 may be effectively removed.

In one embodiment, the cleaning device 12 further includes a turntable 125. The turntable 125 turns the lens 01 between the first blowing apparatus 121, the first wiper apparatus 122, the second wiper apparatus 123, and the second blowing apparatus 124 for executing different cleaning operations.

The cleaning device 12 is further described as below.

Referring to FIG. 9, in one embodiment, the first blowing apparatus 121 includes a plurality of air pipes 1211. The air pipes 1211 may be flexible to provide air along different directions due to a requirement of a cleaning process.

In one embodiment, the first blowing apparatus 121 and the second blowing apparatus 124 may be same or may be different. The air pipes 1211 in the first blowing apparatus 121 and the second blowing apparatus 124 may be deformed to provide air along different directions due to the requirement of the cleaning process.

In one embodiment, each of the first blowing apparatus 121 and the second blowing apparatus 124 may include an air supply member 1212 and an air control member 1213. The air supply member 1212 stores air. The air control component 1213 connects with an end of the air supply member 1212. The first blowing apparatus 121 also include a communication path 1214. The communication path 1214 connects the air supply member 1212 through the air control member 1213. Air from the air supply member 1212 flows through the air control member 1213 and the communication path 1214 into the air pipe 1211. The air control member 1213 controls an amount of the air passing through the communication path 1214.

Figure 10:
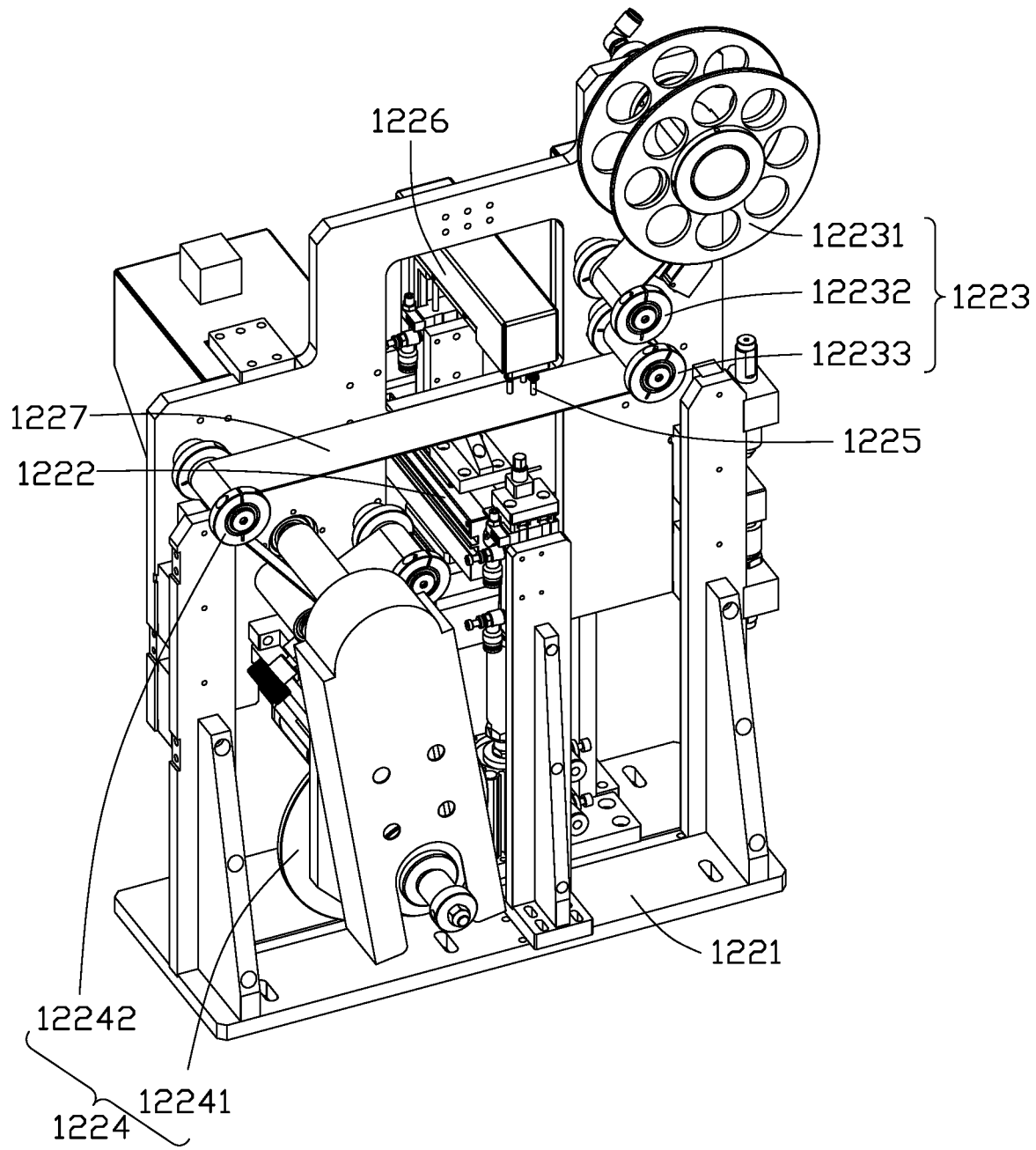
FIG. 10 is a diagram illustrating an embodiment of a first wiper device of a production line according to the present disclosure.
Figure 11:
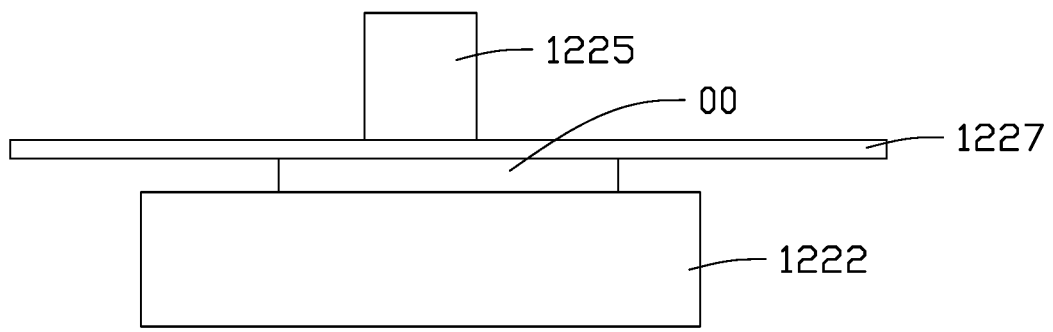
FIG. 11 is a diagram illustrating an embodiment of a component loaded on a second platform for wiping the lens according to the present disclosure.

Referring to FIGS. 10 and 11, in one embodiment, the first wiper apparatus 122 include a second frame 1221, a second load platform 1222, a supplying mechanism 1223, a rewinding mechanism 1224, a first wiper head 1225, and a driving mechanism 1226. The second load platform 1222, the supplying mechanism 1223, the rewinding mechanism 1224, the first wiper head 1225, and the driving mechanism 1226 may be disposed on the second frame 1221. The load platform 1222 loads the lens 01 to be wiped. The supplying mechanism 1223 provides a clean and unused wiping cloth 1227 upon an upper surface of the lens 01 on the second load platform 1222. The first wiper head 1225 driven by the driving mechanism 1226 presses the wiping cloth 1227 on the lens 01 disposed on the second platform 1222 for wiping the lens 01, thus the impurities on the lens 01 may be removed. The rewinding mechanism 1224 recycles the used wiping cloth 1227. For convenience, the component 00 represents the lens 01.

In some embodiments, the supplying mechanism 1223 includes a feeding wheel 12231, a supporting wheel 12232, and a second supporting wheel 12233. The feeding wheel 12231, the supporting wheel 12232, and the second supporting wheel 12233 may be rotationally disposed on the second frame 1221. The feeding wheel 12231, the supporting wheel 12232, and the second supporting wheel 12233 may be disposed upon a wiping surface of the first wiper head 1225 while wiping the component 00. The first supporting wheel 12232 and the second supporting wheel 12233 support the wiping cloth 1227 of the feeding wheel 12231. In one embodiment, the wiping cloth 1227 may be supported by one supporting wheel, such as the first supporting wheel 12232. The rewinding mechanism 1224 includes a rewinding wheel 12241 and a third supporting wheel 12242. The rewinding wheel 12241 and the third supporting wheel 12242 may be rotationally disposed on the second frame 1221. The rewinding wheel 12241 and the third supporting wheel 12242 may be below the wiping surface of the first wiper head 1225 while wiping the component 00. The wiping cloth 1227 leads from the feeding wheel 12231 and entwines at the rewinding wheel 12241 by passing through the first supporting wheel 12232, the second supporting wheel 12233, and the third supporting wheel 12242. The wiping cloth 1227 between the second supporting wheel 12233 and the third supporting wheel 12242 may be disposed between the second platform 1222 and the first wiper head 1225. While wiping the lens 01, the first wiper head 1225 driven by the driving mechanism 1226 presses the wiping cloth 1227 on the surface of the lens 01 and moves along a track.

In some embodiments, the first wiper head 1225 moves along a predetermined track for driving the wiping cloth 1227 to clean the lens 01. By disposing the rewinding wheel 12241 and the third supporting wheel 12242 under the surface of the first wiper head 1225, while wiping the lens 01, the impurities from the rewinding wheel 12241 and the used wiping cloth 1227 may be prevented from falling on the lens 01 or the first wiper head 1225. An effective wiping of the lens 01 is ensured.

In the present disclosure, the first to third supporting wheels 12232-12233, 12242 cooperate with the feeding wheel 12231 and the rewinding wheel 12241 for smoothly moving the wiping cloth 1227, and the wiping cloth 1227 may be effectively supported for cooperating with the moving of the first wiper head 1225. In detail, the wiping cloth 1227 between the second supporting wheel 12233 and the third supporting wheel 12242 is slack, thus a tiny movement between the wiping cloth 1227 and the lens 01 may occur while the first wiper head 1225 is wiping the lens 01. The tiny movement may be in a small distance between the wiping cloth 1227 and the lens 01 while the first wiper head 1225 presses the wiping cloth 1227 on the lens 01, and moves.

Figure 12:
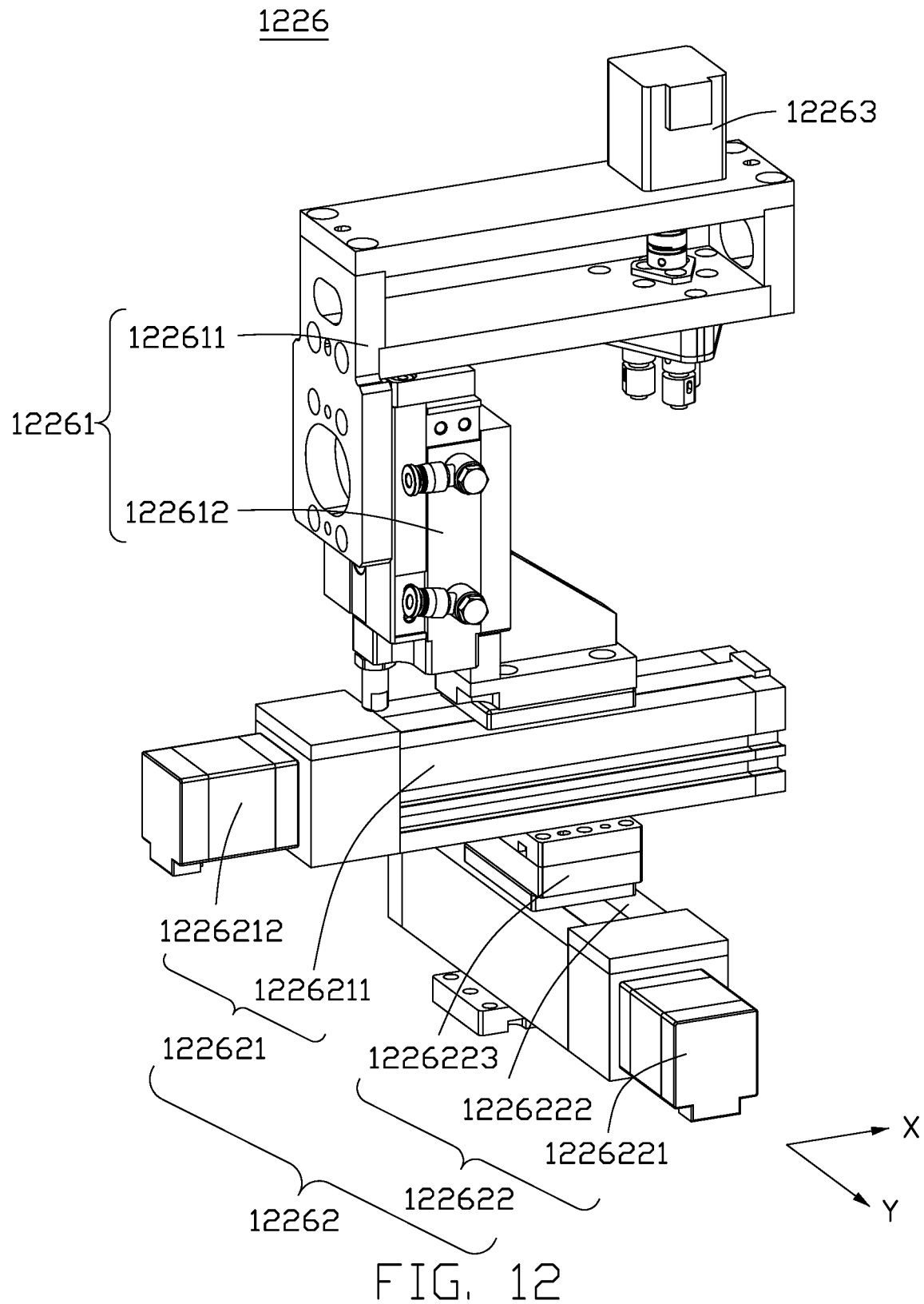
FIG. 12 is a diagram illustrating an embodiment of a driving mechanism of a production line according to the present disclosure.

Referring to FIG. 12, in one embodiment, the driving mechanism 1226 includes a first driving member 12261 and a second driving member 12262. The first driving member 12261 drives the first wiper head 1225 to press on the wiping cloth 1227, and the second driving member 12262 drives the first wiper head 1225 to move along the predetermined track. In one embodiment, the first driving member 12261 includes a supporting frame 122611 and a regulator 122612. The first wiper head 1225 may be disposed on the supporting frame 122611. The supporting frame 122611 may be disposed on the regulator 122612. The regulator 122612 moves the supporting frame 122611 for driving the first wiper head 1225 to move up/down. Thus, a height of the first wiper head 1225 related to the lens 01 may be adjusted. In one embodiment, the regulator 122612 may be a lift cylinder.

In one embodiment, the regulator 122612 may be disposed on the second driving member 12262. The second driving member 12262 moves the regulator 122612 for driving the first wiper head 1225 to move. The second driving member 12262 includes a first direction driving part 122621 and a second direction driving part 122622. The first direction driving part 122621 moves the first wiper head 1225 along a first direction, and the second direction driving part 122622 below the first direction driving part 122621 moves the first wiper head 1225 along a second direction. In one embodiment, the first direction may be perpendicular to the second direction. As shown in FIG. 7, the first direction may be the direction indicated by arrow X, and the second direction may be the direction indicated by arrow Y. In one embodiment, the first direction may be at different angles in the second direction. By moving along the first direction and the second direction, the first wiper head 1225 may be disposed at any point on the surface of the lens 01, and the first wiper head 1225 may move along the whole surface of the lens 01.

In one embodiment, the first direction driving part 122621 and the second direction driving part 122622 orderly move the first wiper head 1225 for forming the predetermined track.

In one embodiment, the first direction driving part 122621 and the second direction driving part 122622 move the first wiper head 1225 at the same time to form various tracks.

In one embodiment, the first direction driving part 122621 includes a third guide rail 1226211 and a first driver 1226212. The first driving member 12261 may be slidably disposed on the third guide rail 1226211. The first driver 1226212 moves the first driving member 12261 for driving the first wiper head 1225 to move along the first direction. The first driver 1226212 may be a power supply, such as a motor, a cylinder, or an oil cylinder, and the like. The second direction driving part 122622 includes a fourth guide rail 1226221, a second driver 1226222, and a slider 1226223. The slider 1226223 may be slidably disposed on the fourth guide rail 1226221, and the fourth guide rail 1226221 connects with the slider 1226223. The second driver 1226222 moves the slider 1226223 for driving the fourth guide rail 1226221 to move along the second direction, thus the first driving member 12261 drives the first wiper head 1225 to move along the second direction. The second driver 1226222 may be a power supply, such as a motor, a cylinder, or an oil cylinder, and the like.

In one embodiment, the driving mechanism 1226 further includes a third driving member 12263. The third driving member 12263 may be disposed on the first driving member 12261 for driving the first wiper head 1225 to rotate, thus by combining the predetermined track, various wiping tracks may be achieved for cleaning the lens 01.

Figure 13:
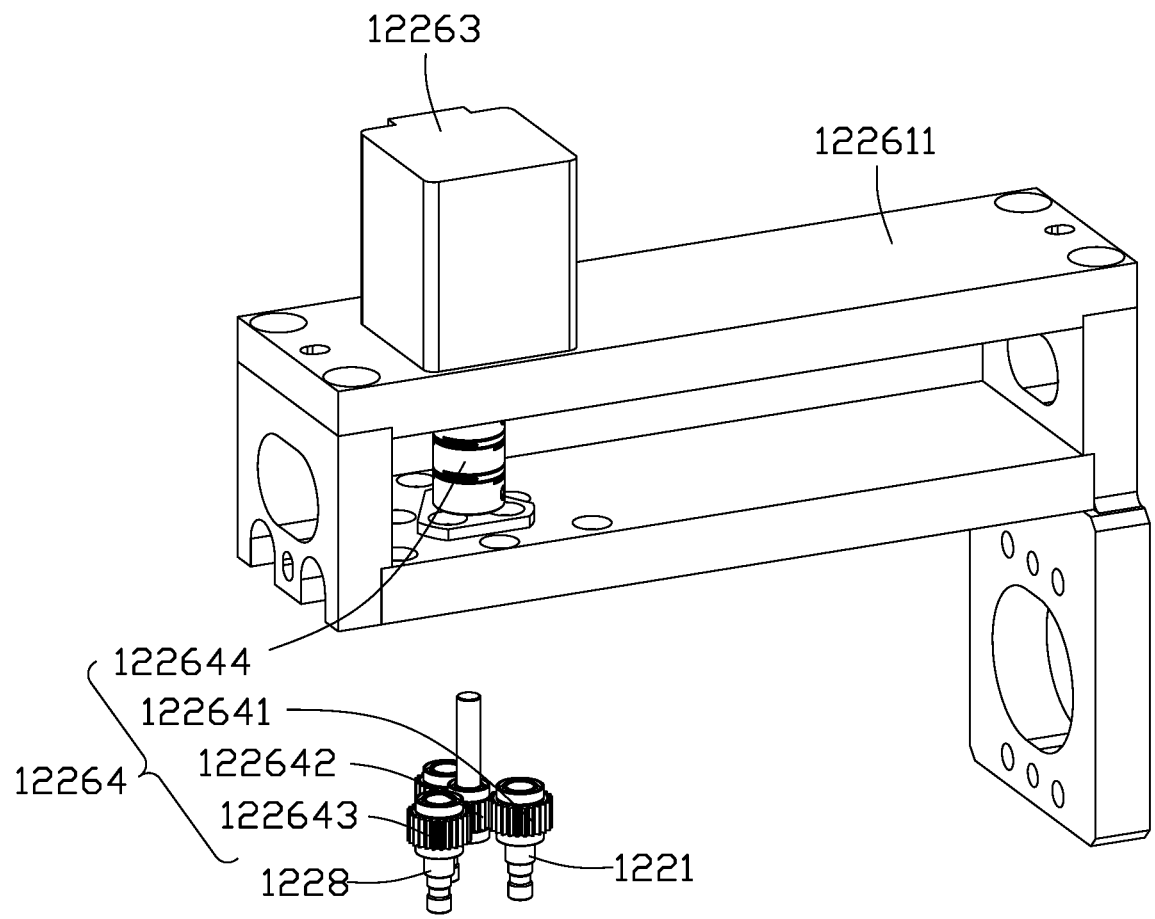
FIG. 13 is a diagram illustrating an embodiment of a connecting member of a production line according to the present disclosure.

Referring to FIG. 13, in one embodiment, the third driving member 12263 may be a power supply, such as a rotating motor, a rotating cylinder, a rotating oil cylinder, or a rotating shaft, and the like. The third driving member 12263 may be disposed on the supporting frame 122611 for driving the first wiper head 1225 to rotate.

Referring to FIG. 13 again, in one embodiment, the first wiper apparatus 122 further include a second wiper head 1228 and a connecting member 12264. The second wiper head 1228 also presses the wiping cloth 1227 on the lens 01 and moves along the predetermined track for wiping another lens 01. The connecting member 12264 connects with the third driving member 12263, the first wiper head 1225, and the second wiper head 1228. The third driving member 12263 drives the first wiper head 1225 and the second wiper head 1228 to rotate through the connecting member 12264.

In one embodiment, the first wiper head 1225 and the second wiper head 1228 may synchronously rotate for wiping two lenses 01 at the same time.

In one embodiment, the first wiper apparatus 122 may further include a third wiper head connected to the connecting member 12264. The third wiper head may be rotated by the third driving member 12263 for synchronous rotation with the first wiper head 1225 and the second wiper head 1228. Thus, three lenses 01 of the component 00 may be synchronously wiped for improving wiping efficiency. In one embodiment, the first wiper apparatus 122 may include more wiper head for synchronously wiping more lenses 01.

Referring to FIG. 13 again, in one embodiment, the connecting member 12264 includes a first gear 122641, a second gear 122642, a third gear 122643, and a connecting rod 122644. The first gear 122641 connects with the first wiper head 1225, the second gear 122642 connects with the second wiper head 1228, and the third gear 122643 connects the third driving member 12263 through the connecting rod 122644. The third gear 122643 also engages with the first gear 122641 and the second gear 122642. The third driving member 12263 drives the third gear 122643 to rotate through the connecting rod 122644 and drives the first gear 122641 and the second gear 122642 to rotate. Thus, the first wiper head 1225 and the second wiper 1228 synchronously rotate. In one embodiment, the first gear 122641, the second gear 122642, and the third gear 122643 may be all helical gears providing an axis pushing force to the first wiper head 1225 and the second wiper head 1228 for steady wiping of the lens 01.

Figure 14:
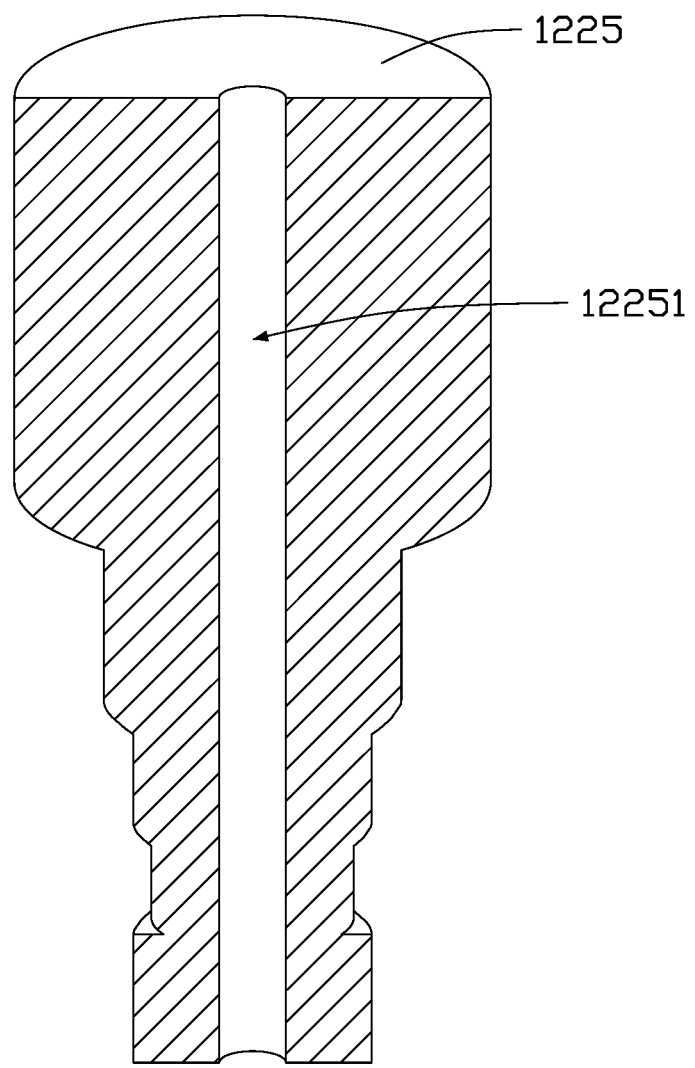
FIG. 14 is a diagram illustrating an embodiment of a first wiper head according to the present disclosure.

Referring to FIG. 14, in one embodiment, the first wiper head includes a first path 12251. The first path 12251 guides cleaning solution to the wiping cloth 1227. The first path may be along an axis of the first wiper head 1225. When the first wiper head 1225 presses on the wiping cloth 1227, the cleaning solution may be between the first wiper head 1225 and the wiping cloth 1227 through the first path 12251 for completely wetting the wiping cloth 1227. By setting the first path 12251 in the first wiper head 1225, a range of the cleaning solution may be limited at the wiping cloth 1227 on the lens 01 without effecting other positions and an amount of the cleaning solution may be accurately controlled. In one embodiment, the second wiper head 1228 may include a second path. The structure and the function of the second path may be the same as those of the first path 12251 or be different from the first path 12251, for providing the cleaning solution while the second wiper 1228 executes the wiping process.

Figure 15:
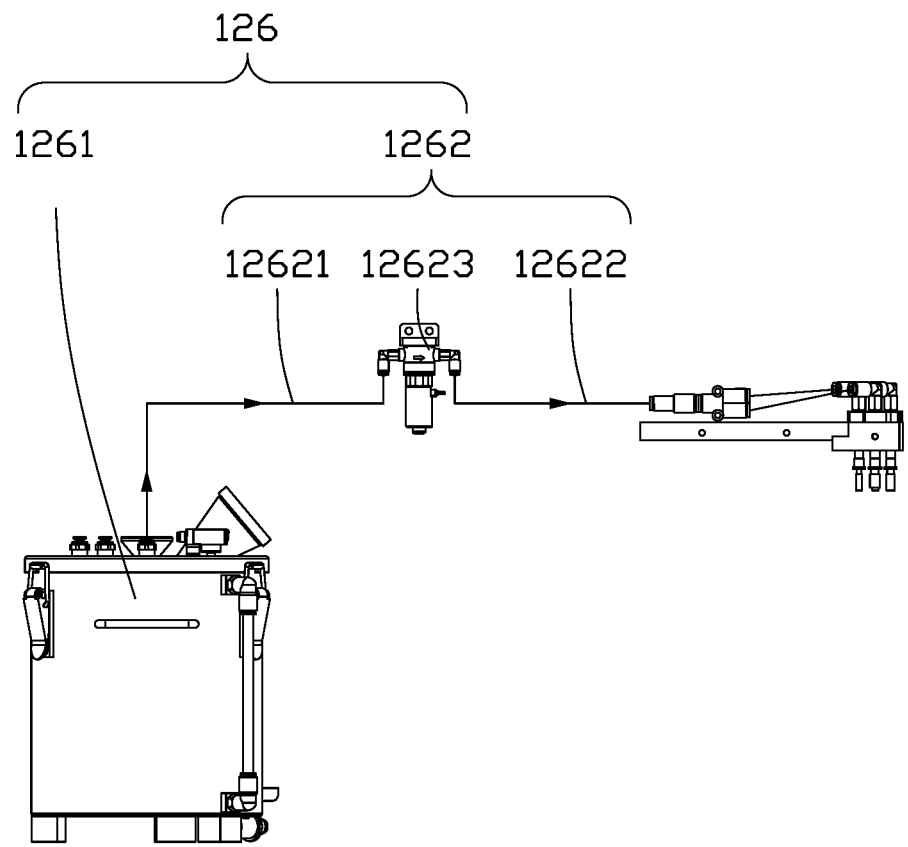
FIG. 15 is a diagram illustrating an embodiment of fluid supply apparatus of a production line according to the present disclosure.

Referring to FIG. 15, in one embodiment, the cleaning device 12 further includes a fluid supply apparatus 126. The fluid supply apparatus 126 includes a fluid storing element 1261 and a fluid controlling element 1262. The fluid storing element 1261 stores the cleaning solution, and the fluid controlling element 1262 connects with an end of the fluid storing element 1261, other end of the fluid controlling element 1262 connects with the first path 12251 of the first wiper head 1225 for transferring the clean solution to the first path 12251 and controlling the amount of the cleaning solution.

In one embodiment, the controlling element 1262 includes a third path 12621, a fourth path 12622, and a fluid adjusting element 12623. The third path 12621 communicates with the fluid storing element 1261, and the fourth path 12622 communicates with the first path 12251. The fluid adjusting element 12623 communicates with the third path 12621 and the fourth path 12622 for adjusting the amount of the cleaning solution from the third path 12621 to the fourth path 12622.

In one embodiment, the third path 12621 and the fourth path 12622 may be fluid paths. The fluid adjusting element 12623 may accurately control the amount of the cleaning solution into the first path 12251 for better cleaning of the lens 01.

Figure 16:
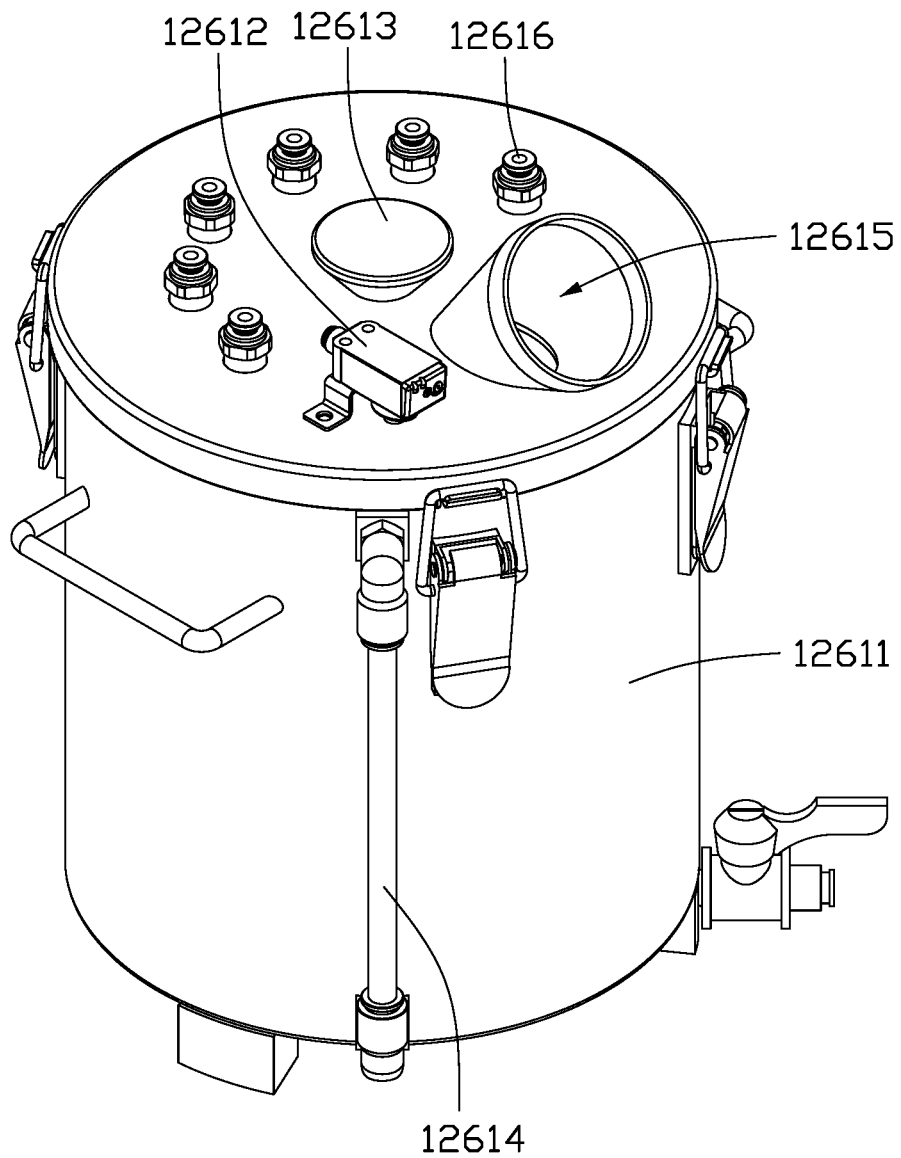
FIG. 16 is a diagram illustrating an embodiment of a fluid storing element according to the present disclosure.

Referring to FIG. 16, in one embodiment, the fluid storing element 1261 includes a body 12611, a fluid detection member 12612, a warner 12613, a visible member 12614, a fluid inlet 12615, and a plurality of fluid outlets 12616. The body 12611 stores the clean solution. The fluid detection member 12612 may be disposed on an upper end of the body 12611 and detects a fluid level in the body 12611. The warner 12613 may be coupled with the fluid detection member 12612. When the fluid level may be less than a specified level, the warner 12613 outputs an information for warning operators to add the clean solution. An end of the visible member 12614 connects with the upper end of the body 12611, and other end of the visible member 12614 connects with a bottom end of the body 12611, thus the fluid level of the cleaning solution may be displayed. The fluid inlet 12615 may be substantially trumpet shaped. The cleaning solution may be added into the body 12611 through the fluid inlet 12615. The fluid outlet 12616 may be disposed on the upper end of the body 12611. The cleaning solution flows into the third path 12621 from the fluid outlet 12616. In some embodiments, the visible member 12614 may be a transparent pipe, based on a binary channel pipe principle, the fluid level of the cleaning solution in the body 12611 may be the same as the fluid level of the cleaning solution in the pipe for directly viewing the fluid level in the body 12611.

In some embodiments, the fluid outlets 12616 may be circularly distributed to surround the warner 12613. The cleaning solution in the fluid storing element 1261 may be directly viewed and show warning for low-level cleaning solution. The fluid outlet may be circularly distributed for uniformly providing the cleaning solution, and the fluid level detected by the fluid detection member 12612 becomes more accurate.

In one embodiment, the second wiper apparatus 12333 has a same structure with the first wiper apparatus 122 and uses the cleaning solution to wipe. The cleaning solution in the second wiper apparatus 12333 may be different from the cleaning solution in the first wiper apparatus 122. In other words, a first cleaning solution may be added in to the first wiper apparatus 122, and a second cleaning solution may be added into the second wiper apparatus 12333. By having different cleaning solutions in the first wiper apparatus 122 and the second wiper apparatus 12333, different types of impurities may be cleaned, a cleaning effect may be improved.

In one embodiment, the second wiper apparatus 12333 has a same structure with the first wiper apparatus 122. The second wiper apparatus 12333 omits the fluid supply apparatus 126, and there may be no path in the wiper head in the second wiper apparatus 12333 for guiding the cleaning solution. Under this structure, the dry second wiper apparatus 12333 wipes for cleaning the cleaning solution remaining on the lens 01 after being wiped by the first wiper apparatus 122, thus the cleaning solution of the first wiper apparatus 122 affects the lens 01.

Figure 17:
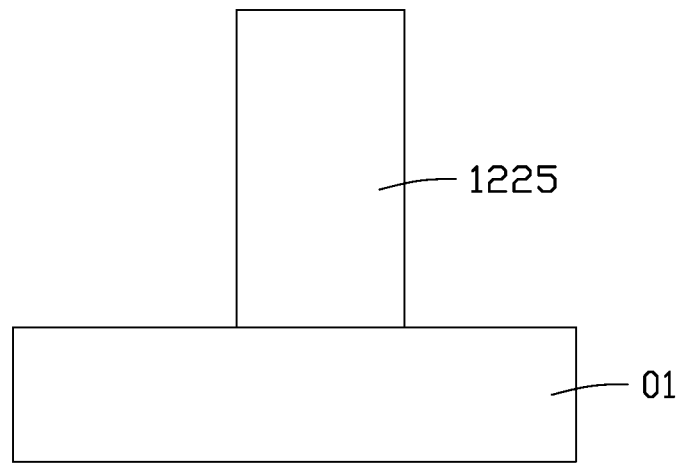
FIG. 17 is a diagram illustrating diameters of the first wiper head and the lens according to the present disclosure.

Referring to FIG. 17, in one embodiment, a diameter of the first wiper head 1225 must be within certain range for cleaning the whole surface of the lens 01. Preferably, the diameter of the first wiper head 1225 and a diameter of the lens 01 may be in a range between 1:3 to 1:5. Under this ratio, the first wiper head 1225 may wipe the lens 01 more effectively. The first wiper head 1225 with a larger diameter may be unable to wipe the lens 01 cleanly, and a wiping efficiency of the first wiper head 1225 with a smaller diameter may be decreased.

Figure 18:
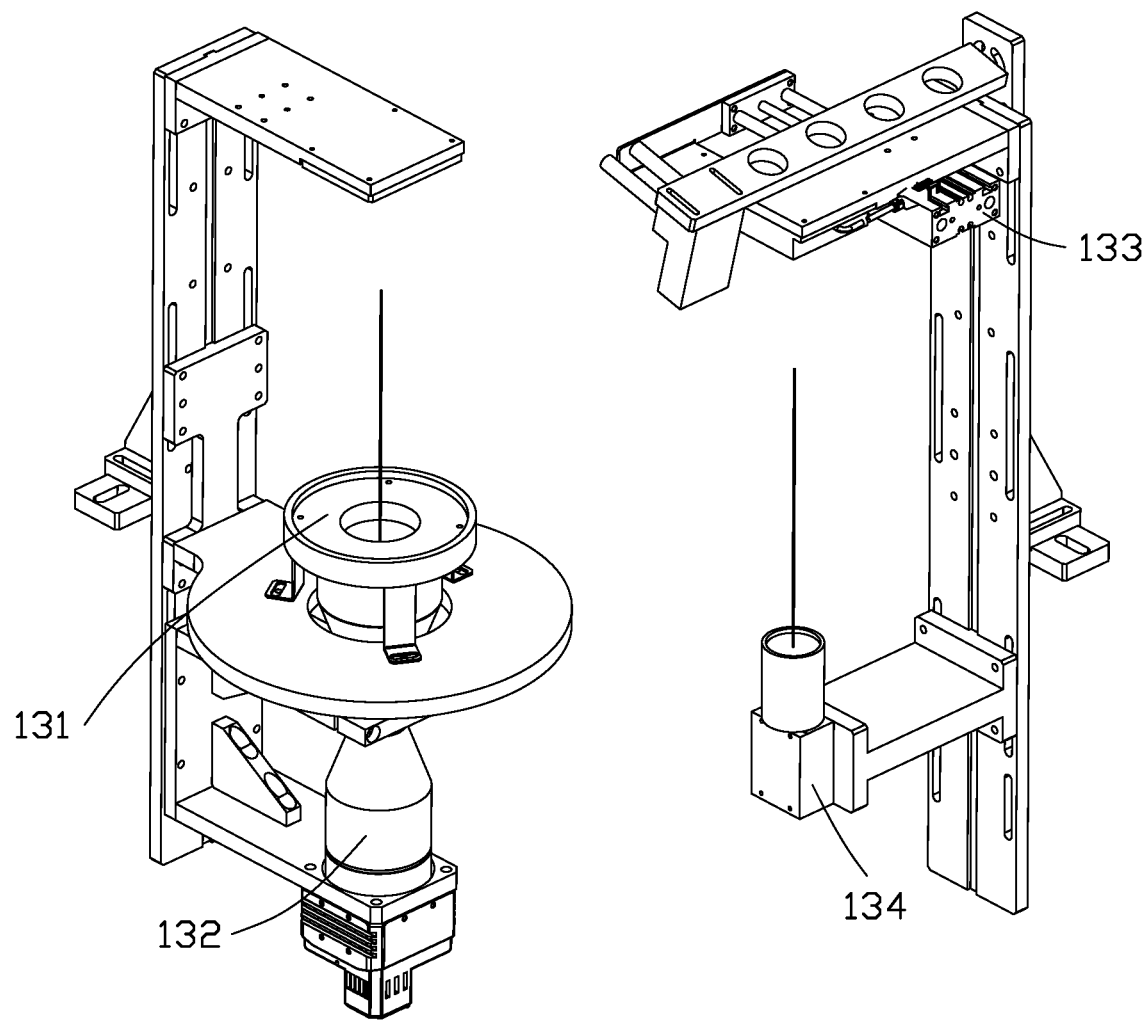
FIG. 18 is a diagram illustrating an embodiment of a detecting device of a production line according to the present disclosure.

Referring to FIG. 18, in one embodiment, the detecting device 13 detects the cleaned lens 01 for determining whether the lens 01 satisfies the cleaning standard. The detecting device 13 includes a circular light source 131, a first charge coupled device (CCD) camera 132, a backlight source 133, a second CCD camera 134, and a controller (not shown). The circular light source 131 and the first CCD camera 132 may be disposed at a first workstation (not shown), and the backlight source 133 and the second CCD camera 134 may be disposed at a second workstation (not shown).

In one embodiment, at the first workstation, the circular light source 131 provides a circle of light. The circular light source 131 may be a light lamp, such as an LED lamp or a fluorescent lamp. The circular light source 131 may provide the light in different angles for highlighting a 3-dimensional information of an object, problems of shading due to the light illuminating from opposite angles may be avoided. The circular light source 131 may be disposed below the lens 01 for providing light to the first CCD camera 132. A central axis of the circular light source 131 may be perpendicular to a surface of the lens 01. The first CCD camera 132 may be disposed below the circular light source 131. The light provided circular light source 131 provides a brightness on the lens 01, the first CCD camera 132 receives the light reflected by the lens 01 and captures a first image of the lens 01.

In one embodiment, at the first workstation, the circular light source 131 may disposed upon the lens 01, and the first CCD camera 132 may be disposed upon the circular light source 131.

At the second workstation, the backlight source 133 may be disposed on a side of the lens 01 and provides a backlight source to the lens 01. An outline of the lens 01 becomes clearer. The second CCD camera 134 may be disposed on an opposite side of the lens 01. The second CCD camera 134 receives the light emitted by the backlight source 133 and captures a second image of the lens 01. The second image may be a two grayscales image, which include only black and white. The outline of the lens 01 and the impurities on the lens 01 may be clearly displayed.

The controller may be coupled to the first CCD camera 132 and the second CCD camera 134. The controller receives the first image and the second image and determines whether the lens 01 satisfies the cleaning standard based on the first image and the second image. In one embodiment, the controller may merge the first image and the second image to form a third image. The third image merged by the first image and the second image may be used for determining whether the lens 01 satisfies the cleaning standard. In some embodiments, the detecting device 13 also may use CCD camera to cooperate with different light sources to obtain the first image. By resolving the first image, the cleanliness of the lens 01 may be determined. In some embodiments, the clean lenses 01 may be transferred to the pasting device 14 by the transfer devices 17A-17E. In some embodiments, the unclean lenses 01 may be collected without being transferred to the pasting device 14. In some embodiment, the unclean lenses 01 may be transferred to the loading device 11 or the cleaning device 12 for reprocessing. The detecting device 13 detects the cleanliness of the cleaned lens 01 for avoiding a leak detection and improving a detection efficiency.

Figure 19:
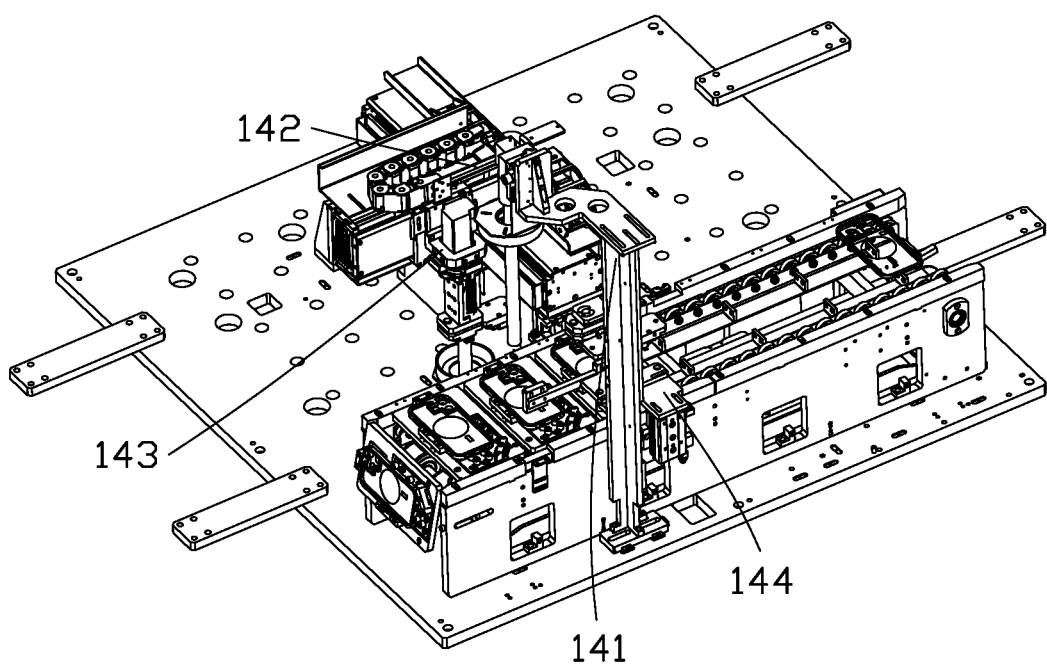
FIG. 19 is a diagram illustrating an embodiment of a pasting device of a production line according to the present disclosure.

Referring to FIG. 19, in one embodiment, the pasting device 14 pastes a protection film on the cleaned lens 01. The pasting device 14 includes a visible locating mechanism 141, a compensating mechanism 142, a pasting mechanism 143, and a pressure keeping mechanism 144. The visible locating mechanism 141 may be a CCD camera. The visible locating mechanism 141 obtains a first position of the lens 01 on the component 00, which is a position of the lens 01 on the component 00 in arriving at the pasting device 14, prepared for receiving the protection film. The compensating mechanism 142 may provide a position compensation along directions X, Y, Z, and along an angle θ to the first position according to a specified position.

After the first position may be compensated, the protection film may be pasted on the lens 01 by the pasting mechanism 143. The pressure keeping mechanism 144 keeps the pressure on the protection film pasted on the lens 01 for completing a film pasting process. The pasting device 14 pastes the protection film on the clean lens 01 for protecting the lens 01 from being polluted again.

Figure 20:
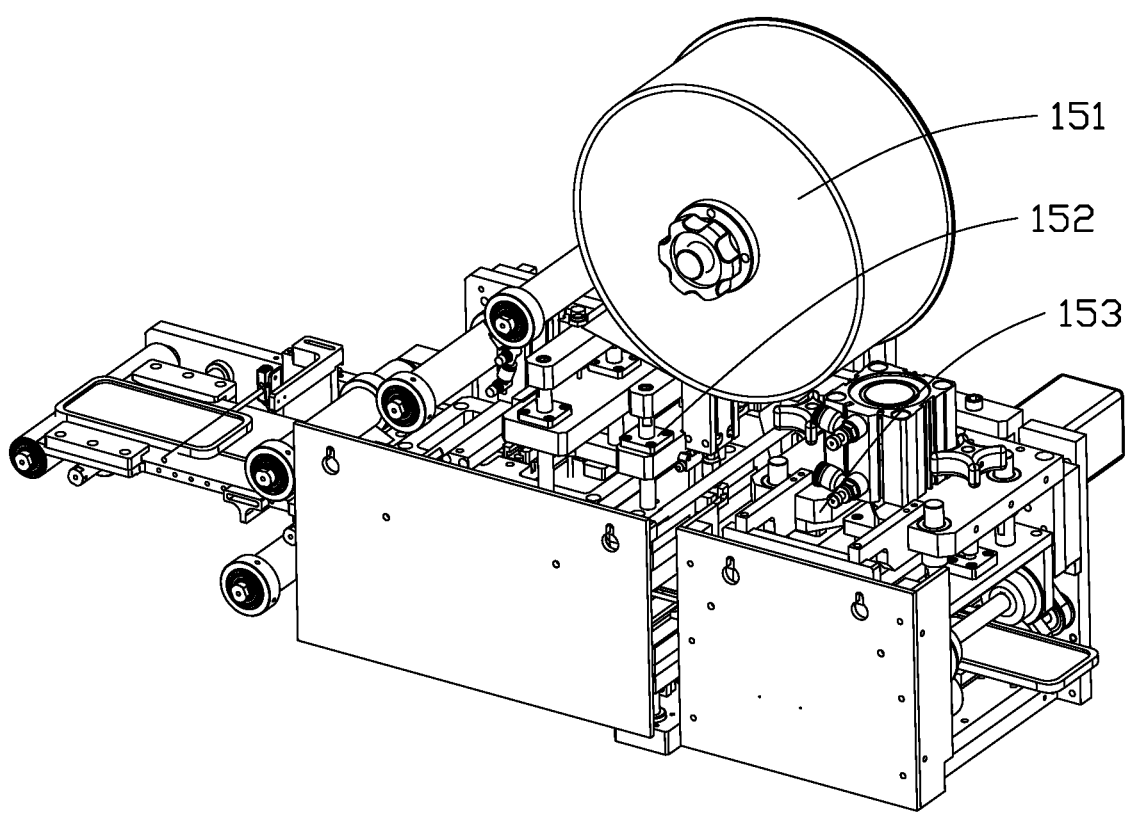
FIG. 20 is a diagram illustrating an embodiment of a heat-sealing device of a production line according to the present disclosure.

Referring to FIG. 20, in one embodiment, the heat-sealing device 15 heat-seals an anti-static film on the lens 01 with the protection film of the component 00. The heat-sealing device 15 includes a film supply mechanism 151, a heat-sealing mechanism 152, and a cutting mechanism 153. The film supply mechanism 151 provides the anti-static film on the component 00. The heat-sealing mechanism 152 heat-seals the anti-static film on the component 00. The component 00 may be better packed because of the anti-static film. The cutting mechanism 153 cuts the heat-sealed anti-static film for obtaining a neat and heat-sealed component 00 with the anti-static film. In some embodiments, the heat-sealing mechanism 15 further include an ion wind supply mechanism (not shown). The ion wind supply mechanism provides ion wind to the component 00 for removing static on the component 00. The anti-static film heat-sealed by the heat-sealing mechanism 15 protects the component 00 and provides a second layer for protecting the lens 01 for preventing static acting to attract impurities onto the lens 01.

Figure 21:
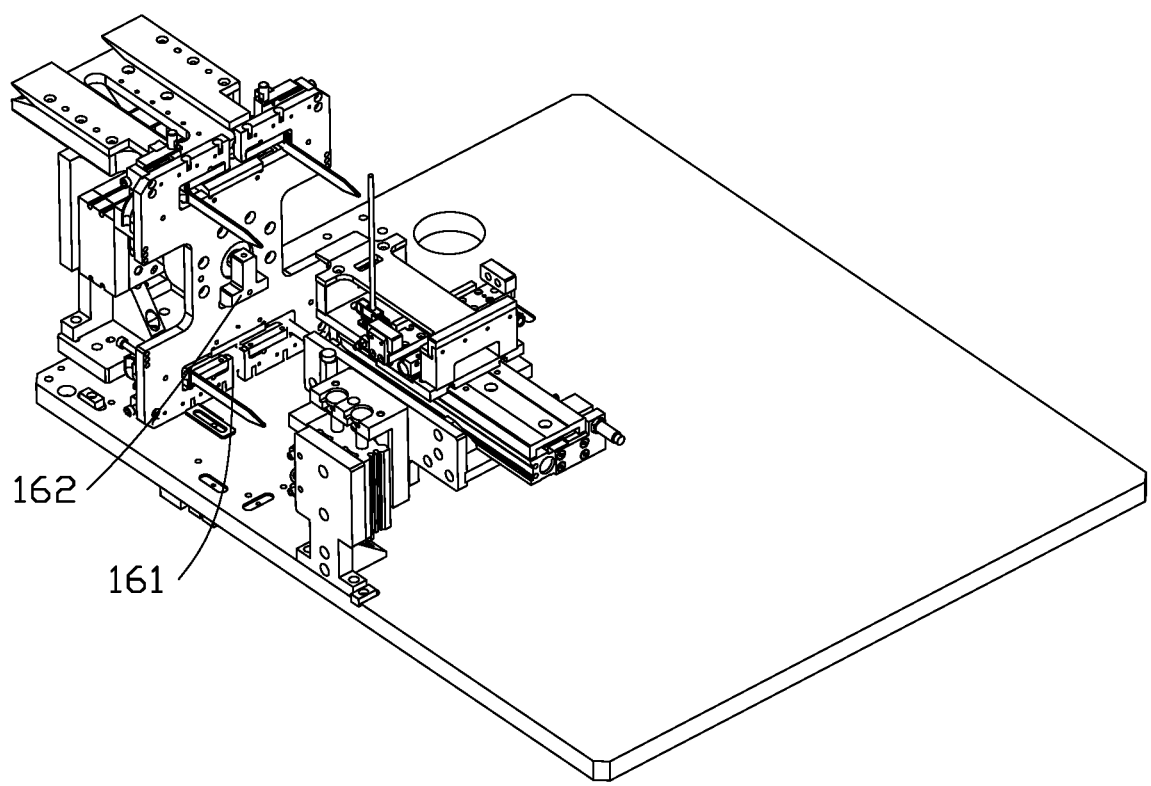
FIG. 21 is a diagram illustrating an embodiment of a packing device according to the present disclosure.

Referring to FIG. 21, in one embodiment, the packing device 16 packs the heat-sealed component 00. The packing device 16 includes an opening mechanism 161 and a packing mechanism 162. The opening mechanism 161 opens a bag, which is prepared for packing the component 00 into the bag. The packing mechanism 162 puts the component 00 in the bag. By packing the component 00, a third layer protection to the lens 01 may be provided for avoiding the component 00 being polluted while in transportation process.

Based on the production line 10, the lens 01 of the component 00 may be automatically processed in loading, cleaning, detecting, film pasting, heat-sealing, and packing, the cleanliness of the lens 01 of the component 00 satisfies the requirement and multiple protection layers may be provided for avoiding subsequent pollution.

Figure 22:
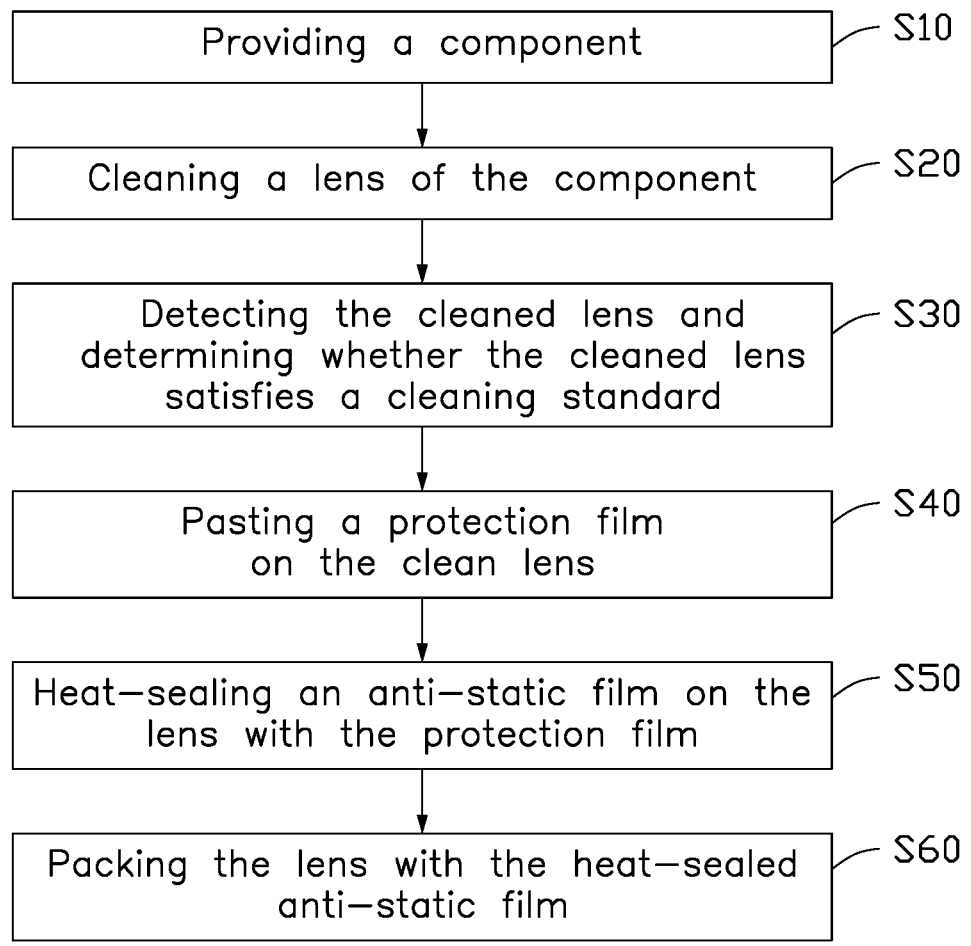
FIG. 22 is a flowchart illustrating an embodiment of a method for processing the lens according to the present disclosure.

The present disclosure also provides a method for processing a component, used in the above production line 10. As shown in FIG. 22, using the lens 01 of the component 00 as an example, the method may comprise at least the following steps, which also may be re-ordered:

In block S10, a component 00 is provided.

The incoming sample supply mechanism of the loading device 11 locates the lens 01 of the component 00 at the locating member 111. The feeding plate 114 receives the assembled lens 01 on the component 00. The picking mechanism arms 1151 of the first guide rail 1152 moves upon the feeding plate 114. The first lift cylinders 11512 of the picking mechanism arms 1151 drops down and. the adsorbing units 11513 adsorbs the component 00. The first lift cylinder 11512 lifts up and moves along first guide rail 1152 to be upon on the locating member 111. The first lift cylinders 11512 of the picking mechanism arms 1151 drops down, and the component 00 adsorbed by the adsorbing units 11513 may be disposed on the locating member 111. The locating member 111 locates the component 00. In one embodiment, the component 00 may be turned over due to the requirement. The second lift cylinders 1131 drives the sliding block 1135 to drop down, thus the nozzles 1123 face to the located component 00. The first sensing block 1135 contacts with the second sensing switch 1134, and the second cylinder 1131 stops moving. The external air source pump to vacuumize. The nozzles 1123 adsorb the component 00. The second cylinder 1131 moves the sliding block 1135 to for positioning the component 00 at a required height, and the first sensing block 1135 contacts with the first sensing switch 1133 for stopping the second cylinder 1131. The rotating cylinder 1136 starts to rotate, and the rotating outputting axis of the rotating cylinder 1136 rotates the second sensing block 1139. The fixing block 11310 rotates according to the second sensing block 1139 for driving the supporting rod 1121 to rotate. The supporting rod 1121 drives the supporting plate 1122 and the nozzles 1123 to turn over.

When the second sensing block 1139 contacts with the fourth sensing switch 1138, the rotating cylinder 1136 stops rotating, and the component 00 may be turned over. The supporting rod 1121, the supporting plate 1122, and the nozzles 1123 may be disposed below the component 00. The mechanism arms 1712 of the transfer devices 17A-17E move upon the component 00 through the first guide rail 1711 for picking up the component 00. The mechanism arms 1712 transfer the component 00 to the cleaning device 12 through the second guide rail 1152. The rotating cylinder 1136 rotates the component 00 picked by the mechanism arms 1712 in a reverse direction for reverting the supporting rod 1121, the supporting plate 1122, and the nozzles 1123 at original position, thus a next component 00 may be turned over.

In block S20, the lens 01 of the component 00 may be cleaned.

The component 00 transferred by the transfer devices 17A-17E enters the chain plate line 172 of the cleaning device 12. The chain plate line 172 transfers the component 00 to different apparatuses in the cleaning device 12 for cleaning. The lens 01 of the component 00 may be processed being first blew, first wiped, second wiped, and second blew for ensuring the impurities on the lens 01 being removed and obtaining a high cleanliness. Then, the cleaned component 00 may be transferred to the chain plate line 172 for transferring below the transfer mechanism 171. The mechanism arms 1712 transfers the cleaned component 00 to the detecting device 13.

In block S30, the cleaned lens 01 may be detected and determined whether the cleaned lens 01 satisfies a cleaning standard.

The component 00 transferred by the transfer devices 17A-17E may enter the chain plate line 172. The chain plate lien 172 may transfer the component 00 to the detecting device 13 for detecting, and determined whether the cleaned lens 01 satisfies the cleaning standard. The clean lens 01 of the component 00 may be transferred to the chain plate line 172. Then, the chain plate line 172 transfers the component 00 below the transfer mechanism 171. The mechanism arms 1712 of the transfer mechanism 171 transfers the clean lens 01 of the component 00 to the pasting device 14. The unclean lens 01 of the component 00 may be collected without being transferred to a next process.

In block S40, the clean lens 01 may be pasted with a protection film.

The component 00 transferred by the transfer devices 17A-17E enters the chain plate line 172 of the pasting device 14. The chain plate line 172 transfers the component 00 to the pasting device 14 for pasting the protection film to form a first protection layer. Then, the component 00 may be transferred to the chain plate line 172. The chain plate line 172 transfers the component 00 below the transfer mechanism 171. The mechanism arms 1712 of the transfer mechanism 171 transfers the component 00 to the heat-sealing device 15.

In block S50, the lens 01 with the protection film may be heat-sealed with an anti-static film.

The component 00 transferred by the transfer devices 17A-17E enters the chain plate line 172 of the heat-sealing device 15. The chain plate line 172 transfers the component 00 to the heat-sealing device 15 for heat-sealing the anti-static film to form a second protection layer. Then, the component 00 may be transferred to the chain plate line 172. The chain plate line 172 transfers the component 00 below the transfer mechanism 171. The mechanism arms 1712 of the transfer mechanism 171 transfers the component 00 to the packing device 16.

In block S60, the lens 01 with the anti-static film may be packed.

The component 00 transferred by the transfer devices 17A-17E enters the chain plate line 172 of the packing device 16. The chain plate line 172 transfers the component 00 to the packing device 16 for packing to form a third protection layer. Then, the component 00 may be transferred to the chain plate line 172. The chain plate line 172 transfers the component 00 below the transfer mechanism 171. The mechanism arms 1712 of the transfer mechanism 171 transfers the component 00 to an outer of the production line 10 for packing or entering other workstations.

The method may automatically load, clean, paste, heat-seal, and pack, an efficiency of processing the lens 01 of the component 00 is improved. The steps may be smoothly executed, and a pace of the method may be adjusted. The lens 01 being processed has a higher cleanliness. Multi protection layers provides a better protection for preventing the lens 01 being polluted again.

Figure 23:
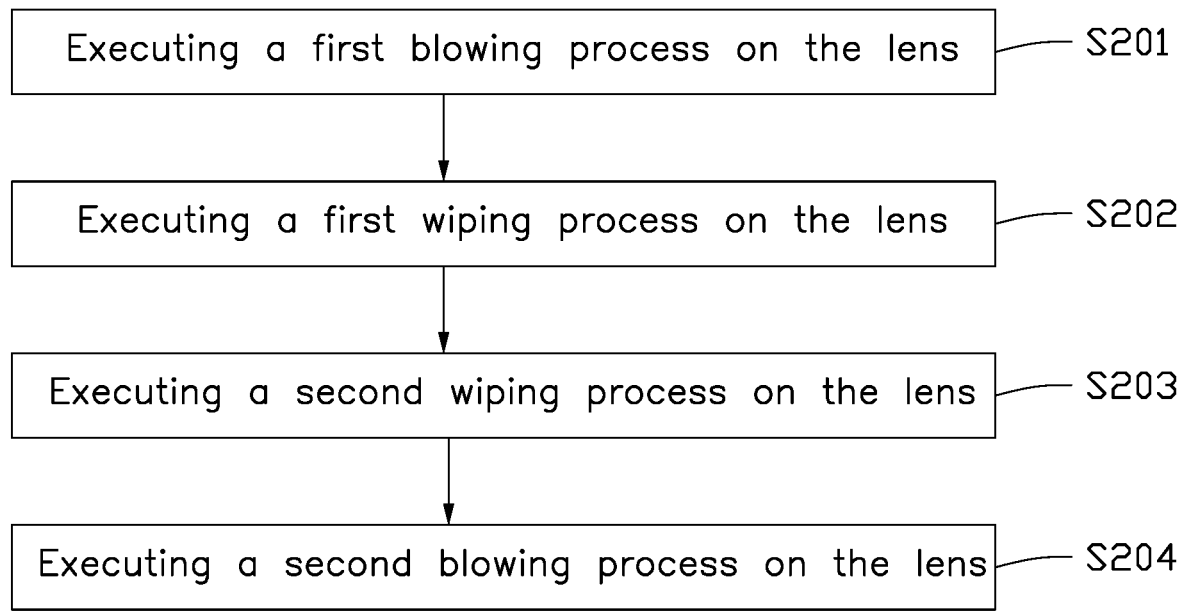
FIG. 23 is a flowchart illustrating an embodiment of a method for cleaning the lens according to the present disclosure.

In one embodiment, as shown in FIG. 23, the step of the block S20 may include:

In block S201, a first blowing process may be executed on the lens 01.

The lens 01 may be blew by air to execute the first blowing process as a first cleaning operation. The first cleaning operation may remove impurities in a larger size or impurities with poor adhesive strength on the lens 01 for avoiding the impurities to scratch the lens 01 in a next wiping operation. The lens 01 is better wiped and the wiping cloth 1227 is protected.

In block S202, a first wiping process may be executed on the lens 01.

The wiping cloth 1227 may be pressed on the surface of the lens 01 by the first wiper head 1225 for wiping the lens 01 as the first wiping process, which is considered as a second cleaning operation. The second cleaning operation may remove the impurities in a small size or impurities with good adhesive strength on the lens 01 through the first wiping operation.

In block S203, a second wiping process may be executed on the lens 01.

The impurities remained on the lens 01 after the first wiping process is wiped for executing the second wiping process. The impurities in a smaller size, the impurities with a better adhesive strength on the lens 01, and the impurities generated after the first wiping operation on the lens 01 may be removed through the second wiping operation.

In block S204, a second blowing process may be executed on the lens 01.

The lens 01 may be blew by air to execute the second blowing process as a fourth cleaning operation. The fourth cleaning operation may remove new impurities generated after the second wiping operation or impurities remained on the surface of the lens 01, which is firmly pasted on the surface of the lens 01 before the first and second wiping operations. The blew air may remove the impurities for better cleaning the lens 01.

By the above cleaning method, the component may be processed under a first blowing process, a first wiping process, a second wiping process, and a second blowing process. Due to the fourth cleaning operations, the cleanliness of the component is high for ensuring the impurities on the surface of the component being removed.

Figure 24:
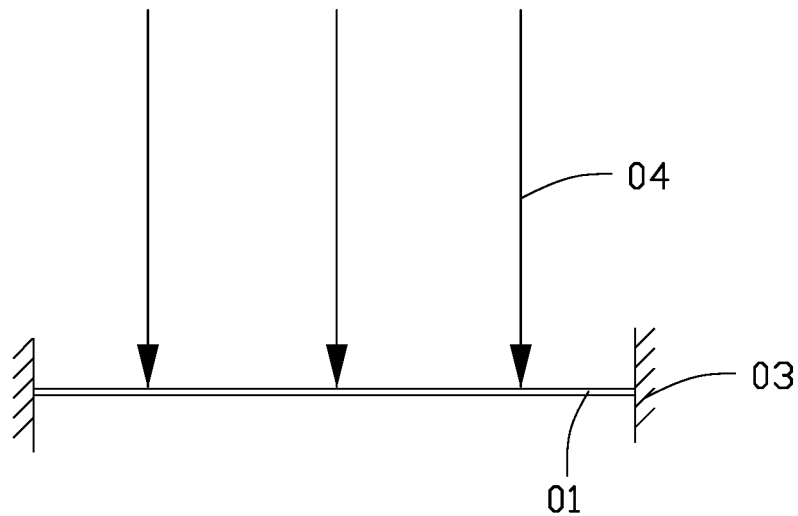
FIG. 24 is a diagram illustrating a first embodiment of the lens being air-blasting according to the present disclosure.

In one embodiment, as shown in FIG. 24, when the lens 01 is fixed by a fixing apparatus 03, the lens 01 is perpendicular to the fixing apparatus 03. The air 04 flows in the first blowing process may be along a direction perpendicular to the surface of the lens 01 for flowing the whole surface of the lens 01. Thus, the surface of the lens 01 may be cleaned. In one embodiment, a time of blowing may be in a range from 4 seconds to 6 seconds.

Figure 25A:
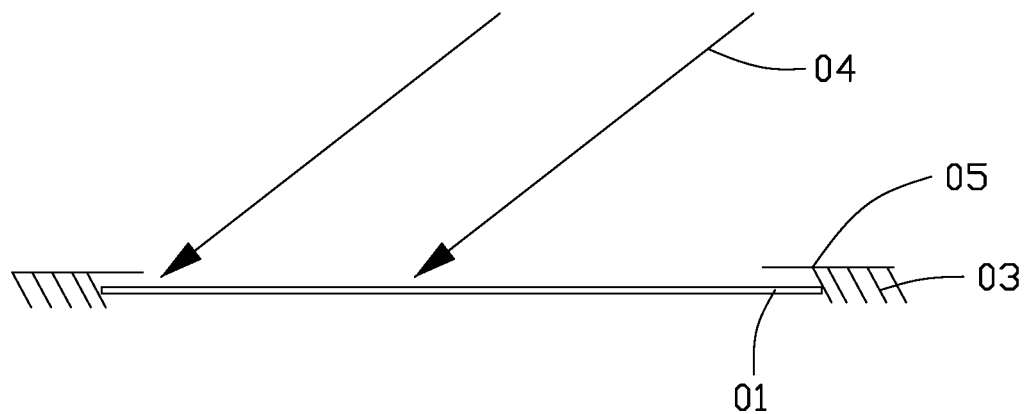
FIGS. 25A-25B are diagrams illustrating a second embodiment of the lens being air-blasting according to the present disclosure.
Figure 25B:
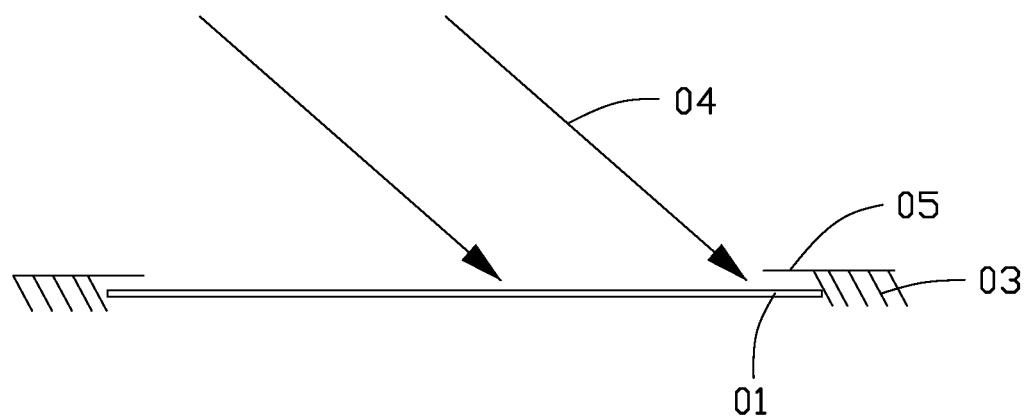

In one embodiment, as shown in FIGS. 25A and 25B, when the lens 01 may be fixed on the fixing apparatus 03, there may be a slot 05 between the lens 01 and the fixing apparatus 03. The air in the first blowing process may be angled with the surface of the lens 01 in an acute angle. Thus, the inclined air may blow into the slot 05 for removing the impurities stored in the slot 05. In one embodiment, a time of blowing may be in a range from 4 seconds to 6 seconds.

Figure 26A:
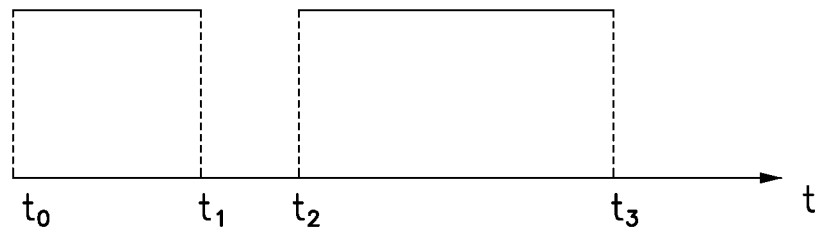
FIGS. 26A-26C are diagrams illustrating embodiments of discontinuous air-blasting of the lens according to the present disclosure.
Figure 26B:
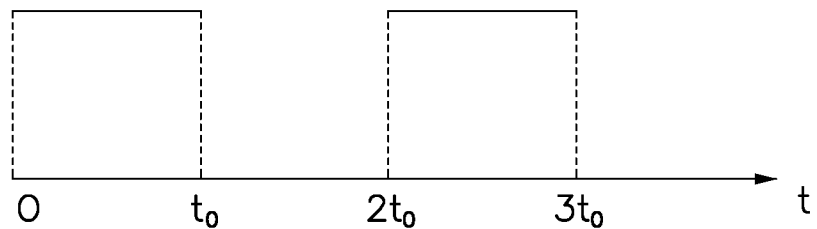
Figure 26C:
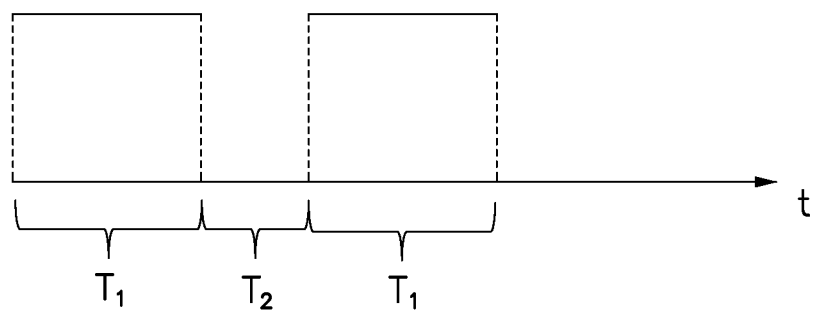

In one embodiment, referring to FIGS. 26A-26C, the air provided by the first blowing process may be discontinuous. By blowing the lens 01 at intervals, the efficiency of removing the impurities in a larger size may be improved.

In one embodiment, as shown in FIG. 26A, the first blowing process may include:

The blowing operation is provided at time $t_0$.

The blowing operation stops at time $t_1$.

The blowing operation is provided at time $t_2$.

The blowing operation stops at time $t_3$.

The time interval between the time $t_3$ and the time $t_0$ is in a range from 4 seconds to 6 seconds.

Under this first blowing process, a time of blowing the air may be different, and the time of stopping blowing the air may be the same as or different from the time of blowing the air. By setting the time of blowing the air and the time of stopping blowing the air, the impurities in a larger size may be easily removed.

In one embodiment, the first blowing process may include:

The blowing operation is provided at time 0.

The blowing operation stops at time $t_0$.

The blowing operation is provided at time $2t_0$.

The blowing operation stops at time $3t_0$.

The time $t_0$ is in a range from 1 seconds to 2 seconds.

Under this first blowing process, a time duration of the blowing operation may be the same as a time duration without the blowing operation, and the impurities in a larger size may be easily removed.

In one embodiment, as shown in FIG. 26C, the first blowing process includes:

In one embodiment, the first blowing process includes:

The blowing operation lasts for a first time duration $T_1$.

The blowing operation stops for a second time duration $T_2$.

The blowing operation then last for the first time duration $T_1$.

A sum time duration of the first blowing process may be in a range from 4 seconds to 6 seconds.

The time duration of the blowing operation may be the same, and the time duration without the blowing operation may be different from the time duration of the blowing operation. Due to the different time durations, the impurities in a larger size may be easily removed.

Figure 27:
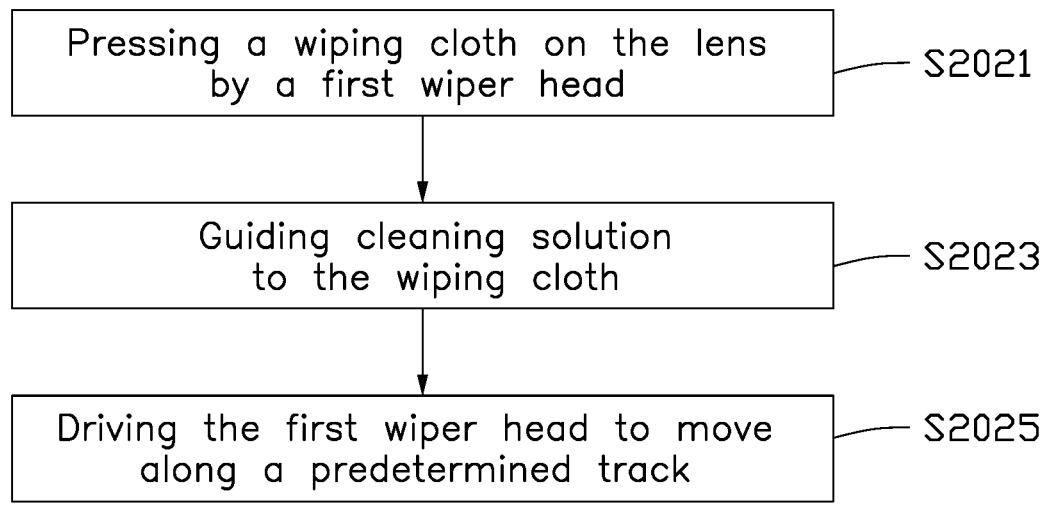
FIG. 27 is a flowchart illustrating a first embodiment of a method for wiping by the first wiper head according to the present disclosure.

In one embodiment, as shown in FIG. 27, the step of the block S202 may include:

In block S2021, the first wiper head 1225 presses the wiping cloth 1227 on the lens 01.

When the component 00 rotates at the workstation of the first wiper mechanism 122 by the rotating plate 125, the regulator 122612 of the first driving member 12261 drives the first wiper head 1225 to drop down. After dropped down a specified distance, the first wiper head 1225 presses the wiping cloth 1227 to be dropped down, until the wiping cloth 1227 presses on the surface of the lens 01 of the component 00.

In block S2023, the cleaning solution may be guided to the wiping cloth 1227.

When the wiping cloth 1227 pressed on the lens 01 by the first wiper head 1225, the fluid supply apparatus 126 provides the cleaning solution to the first path 12251, and the cleaning solution may be guided to be disposed between the first wiper head 1225 and the wiping cloth 1227 through the first path 12251. Thus, while wiping process, the cleaning solution may be continuously or discontinuously guided into the wiping cloth 1227.

In block S2025, the first wiper head 1225 moves along a predetermined track.

After guiding the cleaning solution into the wiping cloth 1227, the first wiper head 1225 moves along the predetermined track for driving the wiping cloth 1227 to wipe the lens 01.

By guiding the cleaning solution between the first wiper head 1225 and the wiping cloth 1227, an amount of the cleaning solution may be accurately controlled, and the cleaning solution may be continuously or discontinuously guided into the wiping cloth 1227 for providing a better wiping effective. A cleaning effective and the cleanliness of the lens 01 may be improved.

Figure 28:
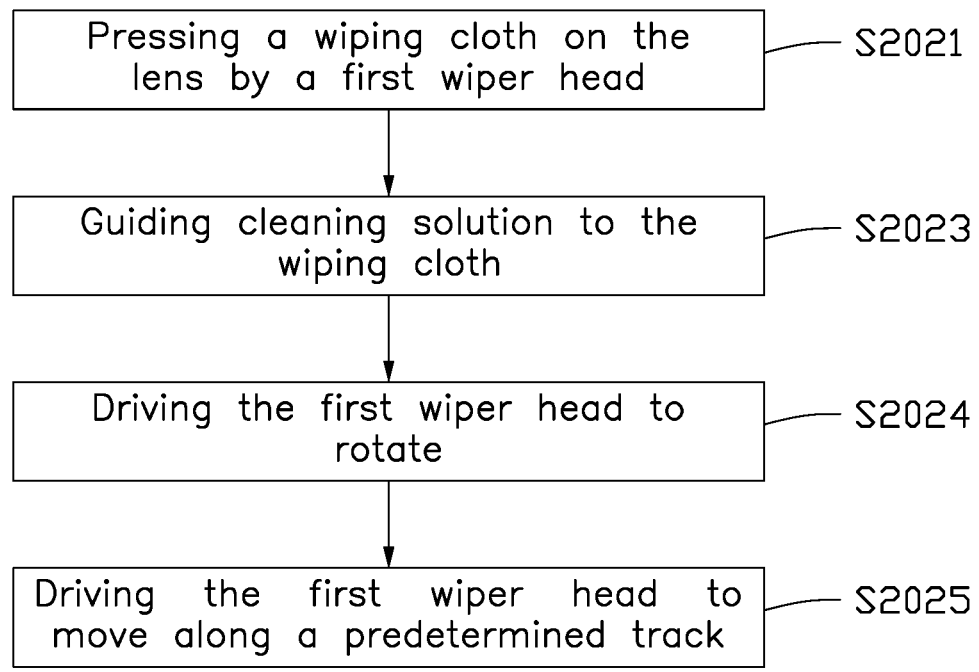
FIG. 28 is a flowchart illustrating a second embodiment of a method for wiping by the first wiper head according to the present disclosure.

In one embodiment, as shown in FIG. 28, the step of the block S20 includes:

In block S2021, the first wiper head 1225 presses the wiping cloth 1227 on the lens 01.

In block S2023, the cleaning solution may be guided to the wiping cloth 1227.

In block S2024, the first wiper head 1225 rotates.

In block S2025, the first wiper head 1225 moves along a predetermined track.

When the wiping cloth 1227 pressed on the lens 01 by the first wiper head 1225 and the cleaning solution may be guided into the wiping cloth 1227, the first wiper head 1225 rotates and keep rotating until the first wiping process ends. By combining the rotation and the predetermined track, a various wiping path may be achieved. Due to a rotation of the first wiper head 1225, a horizontal shear force may be provided while the wiping cloth 1227 wipes the lens 01. The impurities in a small size or impurities with good adhesive strength on the lens 01 is better removed. In detail, the driving mechanism 1226 includes the first driving member 12261, a second driving member 12262, and a third driving member 12263. The first driving member 12261 drives the first wiper head 1225 to press the wiping cloth 1227, and the second driving member 12262 drives the first wiper head 1225 to move along the predetermined track. The third driving member 12263 connects with the first driving member 12261. The first wiper head 1225 connect with the third driving member 12263 and rotates driven by the third driving member 12263.

Figure 29:
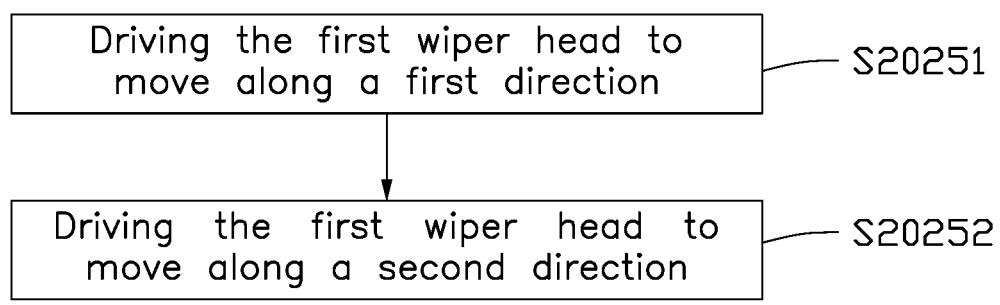
FIG. 29 is a flowchart illustrating a method for driving the first wiper head to move along a predetermined track according to the present disclosure.

In one embodiment, as shown in FIG. 29, the step of the block S2025 may include:

In block S20251, the first wiper head 1225 moves along a first direction.

The second driving member 12262 includes a first direction driving part 122621. The first direction driving part 122621 drives the first wiper head 1225 to move along the first direction.

In block S20252, the first wiper head 1225 moves along a second direction.

The second driving member 12262 includes a second direction driving part 122622. The second direction driving part 122622 connected with the first direction driving part 122621 drives the first wiper head 1225 to move along the second direction.

In one embodiment, the first direction may be perpendicular to the second direction.

While the first wiping process, the first wiper head 1225 driven by the second driving member 12262 moves along the predetermined track. While the moving of the first wiper head 1225, the lens 01 may be wiped based on a larger wiping strength, and the cleaning efficiency is better.

In one embodiment, while the first wiping process of the lens 01, the first wiper head 1225 under the predetermined track moves along the first direction and the second direction at the same time. By a movement along the first direction and the second direction at the same time, the predetermined track may be more complex and better for designing different tracks being satisfy with different wiping requirements or different wiping objects.

Figure 30:
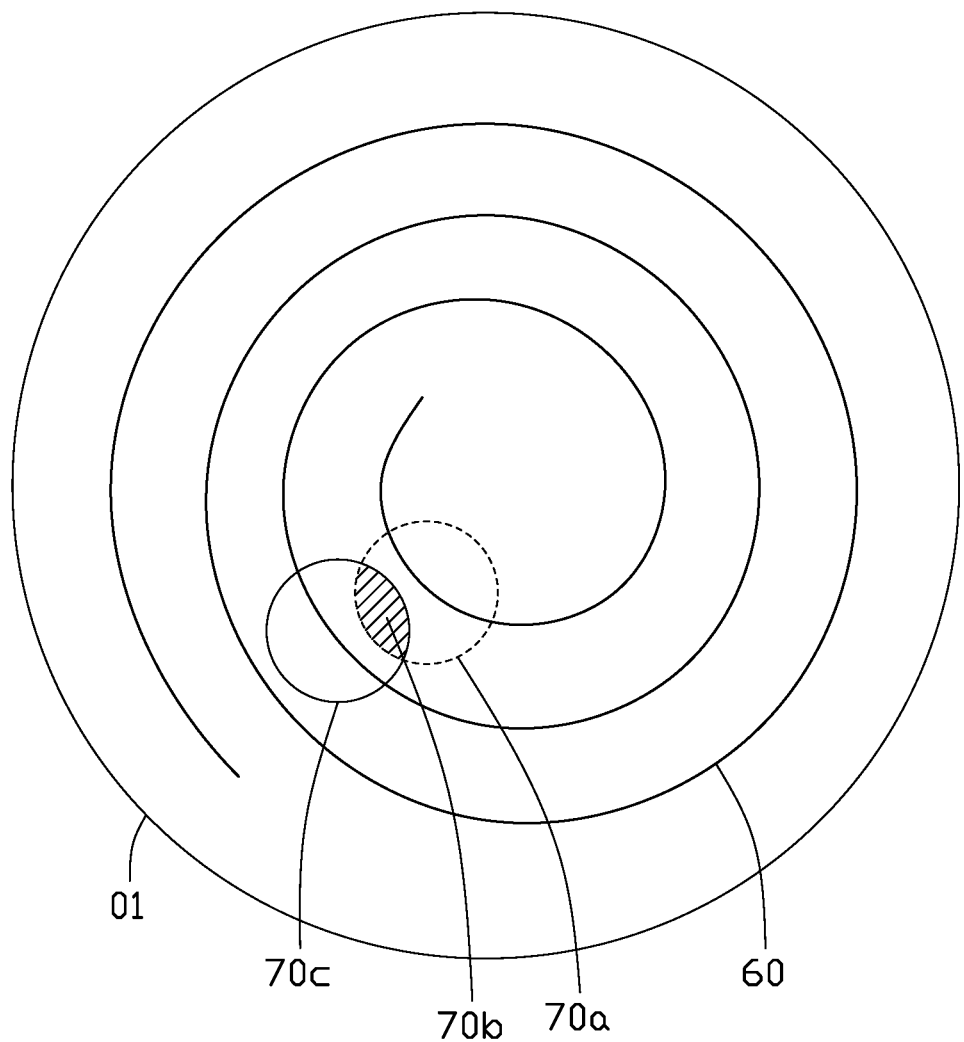
FIG. 30 is a diagram illustrating an embodiment of the predetermined track of the first wiper head of FIG. 29 according to the present disclosure.

In one embodiment, as shown in FIG. 30, while the first wiping process of the lens 01, the predetermined track may from a center of the lens 01 and spirally outwards to form a wiping track 60. The wiping track 60 may fully cover the whole surface of the lens 01. Due to the wiping track 60 being spirally outwarded, the first wiper head 1225 with a specified diameter may repeatedly wipe the lens 01. A first wiper region 70a, a crossed region 70b, and a second wiper region 70c of the first wiper head 1225 may be shown in FIG. 30. The first wiper head 1225 may wipe the whole surface of the lens 01 for improving a cleaning efficiency. The first wiper region 70a represents a region of the first wiper head 1225 at an original position before moving, the second wiper region 70c represents a region of the first wiper head 1225 being moved, the crossed region 70b represents an overlapped region between the first wiper region 70a and the second wiper region 70c. There may be a plurality of the crossed regions 70b being covered the whole surface of the lens 01.

Based on the method of cleaning the lens 01, the first blowing process removes the impurities in a larger size for avoiding the impurities to scratch the lens 01 in a next wiping operation. The first wiping process wipes the lens with the cleaning solution. The second wiping processes wipes the lens 01 after the first wiping process for removing the impurities in a smaller size, the impurities with a better adhesive strength, and the impurities generated after the first wiping operation on the lens 01. The second blowing process removes new impurities generated after the second wiping operation. The lens 01 may be orderly processed under the first blowing process, the first wiping process, the second wiping process, and the second blowing process for cleaning. Thus, the lens 01 satisfies the cleaning standard.

Figure 31:
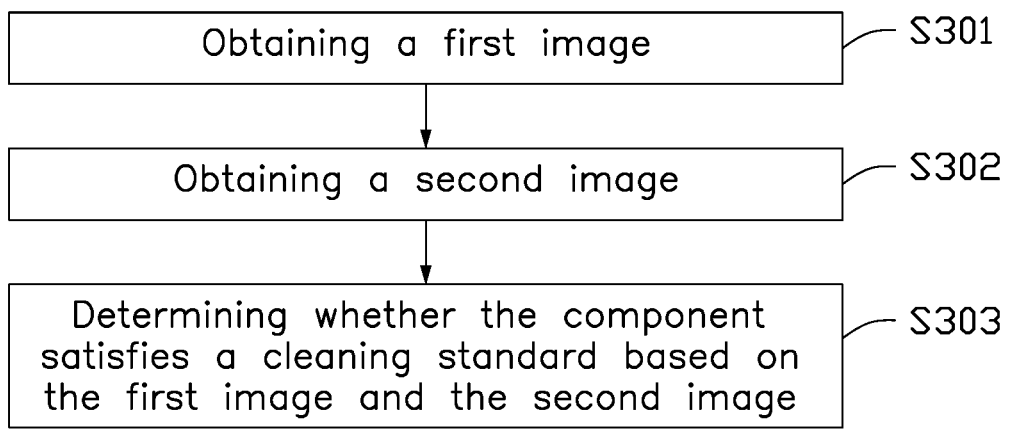
FIG. 31 is a flowchart illustrating a method for detecting the lens according to the present disclosure.

As shown in FIG. 31 in one embodiment, the step of the block S30 includes:

In block S301, a first image may be obtained.

The circular light source 131 provides circle light illuminated on the lens 01 on the component 00. The first CCD camera 132 disposed on a side of the circular light source 131 away from the lens 01 captures the first image based on the light illuminated on the lens 01.

In block S302, a second image may be obtained.

The backlight source 133 provides a light and dark field. The backlight source 133 and the second CCD camera 134 may be disposed on opposite sides of the lens 01 of the component 00. The second CCD camera 134 captures the second image of the lens 01 of the component 00 based on the backlight source 133.

In block S303, whether the lens 01 of the component 00 satisfies the cleaning standard may be determined based on the first image and the second image.

The controller resolves the first image and the second image. Due to different images under different light sources, different types of the impurities may be captured. The controller computes an amount of each type of the impurities based on the first image and the second image and computes a ratio of each type of the impurities on the lens 01. When the amount of at least one type of the impurities is larger than a specified standard value, the controller determines that the lens 01 does not satisfy the cleaning standard. When the amount of each type of the impurities is less than the specified standard value, the controller determines that the lens 01 satisfies the cleaning standard.

When the cleanliness of the lens 01 satisfy the cleaning standard, the procedure goes to the block S40.

When the cleanliness of the lens 01 does not satisfy the cleaning standard, the procedure may return to the block S20, or the unclean lens 01 may be collected at the detecting device 13 for avoiding being flowed into the next process. The collected component 00 may be manually cleaned, and then being re-loaded by the loading device 11.

Figure 32:
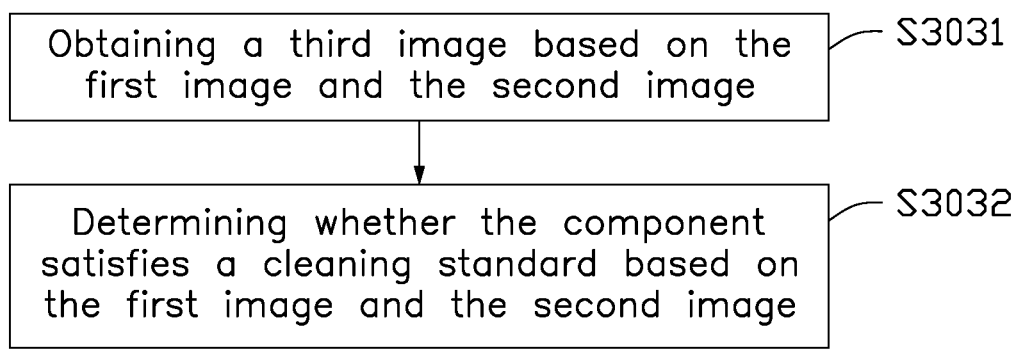
FIG. 32 is a flowchart illustrating an embodiment of a method for determining whether the lens satisfies a cleanliness standard according to the present disclosure.

As shown in FIG. 32, in one embodiment, the step of block S303 includes:

In block S3031, a third image may be obtained based on the first image and the second image.

The images under different light source represent different types of the impurities. The controller may merge the first image and the second image to obtain the third image. The merged third image unifies different parameters of the first image and the second image into a common parameter by an algorithm. The parameter of the first image and the parameter of the second image may be computed under a related computing formular for unifying the image of different types of the impurities. The third image includes the parameters of the first image and the second image and reflects contents of the first image and the second image.

In block S3032, whether the lens 01 of the component 00 satisfies the cleaning standard may be determined based on the third image.

The controller computes an amount of each type of the impurities based on the third image and computes a ratio of each type of the impurities on the lens 01 of the component 00. When the amount of at least one type of the impurities may be larger than a specified standard value, the controller determines that the lens 01 of the component 00 does not satisfy the cleaning standard. When the amount of each type of the impurities is less than the specified standard value, the controller determines that the lens 01 of the component 00 satisfies the cleaning standard.

Figure 33:
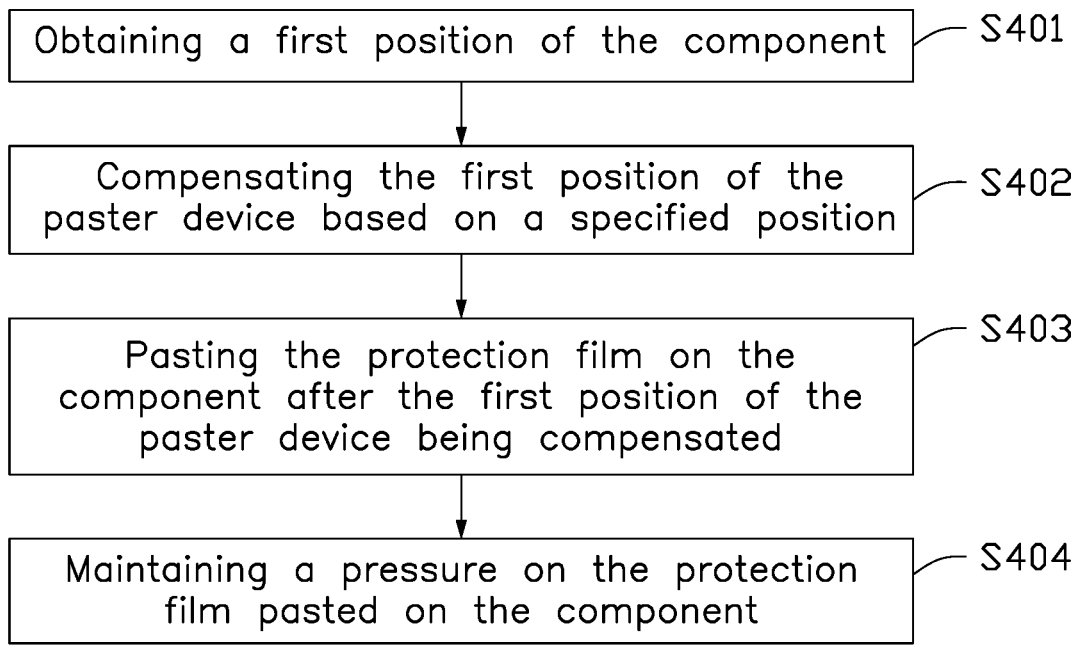
FIG. 33 is a flowchart illustrating a method for pasting a protection film on the component according to the present disclosure.

As shown in FIG. 33, in one embodiment, the step of S40 includes:

In block S401, a first position of the lens 01 on the component 00 may be obtained.

The visible locating mechanism 141 obtains the first position of the lens 01, which is a position of the lens 01 on the component 00 arrived at the pasting device 14 and prepares for pasting the protection film In block S402, the first position of the pasting mechanism 143 may be compensated based on the first position and a specified position.

The compensating mechanism 142 may provide the position compensation along directions X, Y, Z, and along an angle θ to the first position according to a specified position. A difference between the first position and the specified position may be used for compensating the position of the paster mechanism 143. The compensated paster mechanism 143 faces the lens 01.

In block S403, the paster mechanism 143 pastes the protection film on the lens 01 of the component 00.

In block S404, the pressure of the protection film pasted on the lens 01 of the component 00 may be maintained.

The pressure keeping mechanism 144 keeps the pressure on the protection film pasted on the lens 01 of the component 00 for completing a film pasting process.

After the pasting process, the lens 01 of the component 00 may be protected by the protection film for forming a first layer protection and preventing the lens 01 on the component 00 from being polluted and scratched again.

Figure 34:
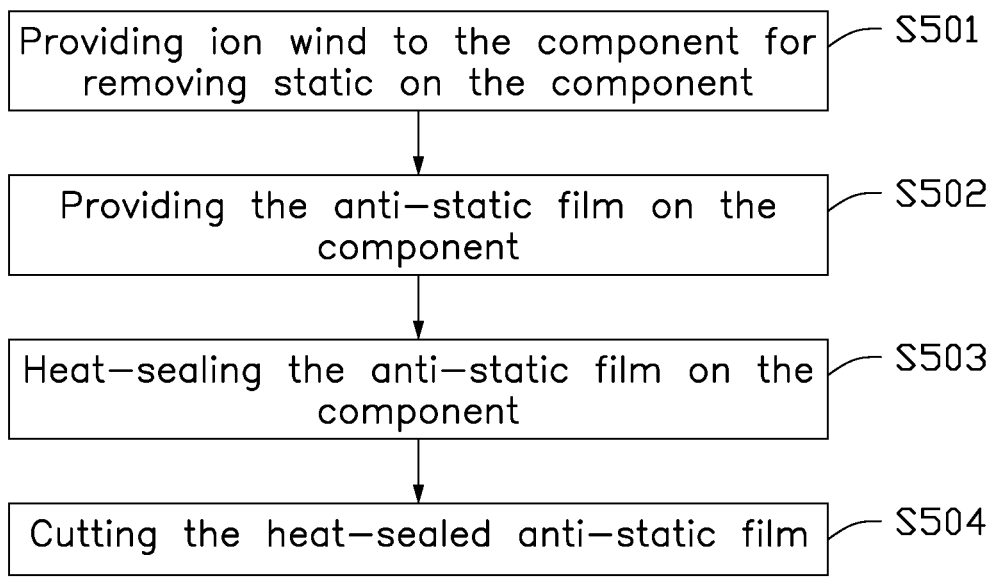
FIG. 34 is a flowchart illustrating a method for heat-sealing the component according to the present disclosure.

As shown in FIG. 34, in one embodiment, the step of S50 includes:

In block S501, ion wind may be provided to the component 00.

The wind supply mechanism provides ion wind to the component 00 for removing static on the component 00, thus the impurities on the lens 01 being adsorbed by the static may be prevented.

In block S502, an anti-static film may be provided on the component 00.

The component 00 being processed by the ion wind may be pasted with the anti-static film. The anti-static film may be a PE film or other type film for preventing the static. The anti-static film with a high transmission may ensures a quality of the productor, which may be easily removed without residues of glue. The anti-static film has an excellent efficiency of anti-static protection and prevents dust being adsorbed.

In block S503, the anti-static film on the lens 00 may be heat-sealed.

The component 00 may be better packed by the heat-sealed anti-static film.

In block S504, the heat-sealed anti-static film may be cut.

The cutting mechanism 153 cuts the heat-sealed anti-static film for obtaining a neat and heat-sealed component 00 with the anti-static film and obtaining a second layer protection.

Figure 35:
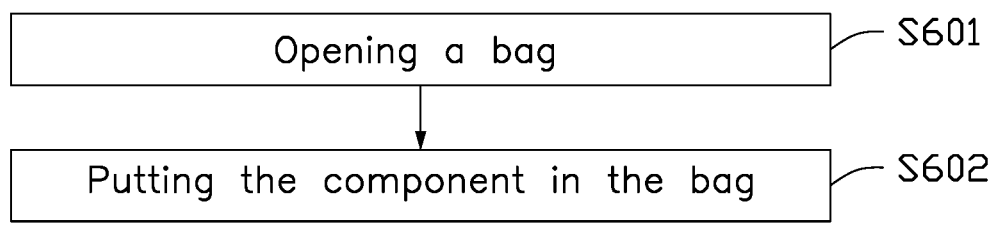
FIG. 35 is a flowchart illustrating a method for packing the component according to the present disclosure.

As shown in FIG. 35, in one embodiment, the step of S60 includes:

In block S601, a bag may be opened.

An opening of the bag for packing the component 00 may be opened, which is convenience for putting the component 00.

In block S602, the component 00 may be putted into the bag.

The component 00 being inputted in the bag provides a third layer protection to the lens 01 of the component 00.

Based on the method of processing, the of lens 01 of the component 00 with a high cleanliness is achieved for improving a cleaning efficiency in related art. The method is automatically processed, a production efficiency is improved. The process of loading, cleaning, detecting, film pasting, heat-sealing, and packing may be combined with each other. The lens 01 with the high cleanliness may be protected by multi-layers due to the packing structure for meeting a high delivery standard and preventing being polluted again.

Many variations and modifications may be made to the above-described embodiment(s) of the disclosure without departing substantially from the spirit and principles of the disclosure. All such modifications and variations may be intended to be included herein within the scope of this disclosure and protected by the following claims. The foregoing description, for purpose of explanation, has been described with reference to specific embodiments. However, the illustrations above may be not intended to be exhaustive or to limit the invention to the precise forms disclosed. Many modifications and variations may be possible. The embodiments explain the principles of the invention and its practical applications, to thereby enable others skilled in the art to best use the invention and various described embodiments with various modifications as may be suited to the particular use contemplated.

What is claimed is:

1. A production line for processing a component, the production line comprising:
   a loading device for providing the component;
   a cleaning device for cleaning the component;
   a detecting device for detecting the cleaned component and determine whether the cleaned component satisfies a cleaning standard;
   a pasting device for pasting a protection film on the component when the component is determined to satisfy the cleaning standard;
   a heat-sealing device for heat-sealing an anti-static film on the component pasted with the protection film;
   a packing device for packing the component heat-sealed with the anti-static film; and
   transfer devices disposed among at least two of the loading device, the cleaning device, the detecting device, the pasting device, the heat-sealing device, and the packing device, and the transfer devices for transferring the component, each of the transfer devices comprising a first guide rail and mechanism arms;

wherein the loading device, the cleaning device, the detecting device, the pasting device, the heat-sealing device, and the packing device are connected by the first guide rail, the mechanism arms are disposed on the first guide rail for transferring the component;

the cleaning device comprises:

a first blowing apparatus for executing a first blowing process on the component;

a first wiper apparatus for executing a first wiping process on the component;

a second wiper apparatus for executing a second wiping process on the component; and a second blowing apparatus for executing a second blowing process on the component, wherein the first wiper apparatus comprises a first wiper head for pressing a wiping cloth on the component for wiping the component, the first wiper head comprises a first path, the first path is for guiding a cleaning solution to the wiping cloth, and the second wiper apparatus is for wiping the cleaning solution on the component.

2. The production line of claim 1, wherein the loading device comprises:

a locating member for locating the component;

an adsorbing member for adsorbing the component; and a rotating member for rotating the component.

3. The production line of claim 1, wherein the first wiper apparatus further comprises:

a supplying mechanism for providing the wiping cloth; and a rewinding mechanism disposed below the first wiper head and for rewinding the wiping cloth.

4. The production line of claim 1, wherein the first wiper apparatus further comprises:

a driving mechanism for driving the first wiper head to press on the wiping cloth and drive the first wiper head to move along a predetermined track, and wherein the driving mechanism comprises:

a first driving member for driving the first wiper head to press on the wiping cloth; and a second driving member for driving the first wiper head to move along the predetermined track, the first driving member is disposed on the second driving member.

5. The production line of claim 4, wherein the driving mechanism further comprises:

a third driving member disposed on the first driving member and for rotating the first wiper head; and the first wiper apparatus further comprises:

a second wiper head for pressing the wiping cloth on the component and move along the predetermined track for wiping the component; and a connecting member for connecting the third driving member, the first wiper head, and the second wiper head, wherein the third driving member drives each of the first wiper head and the second wiper head to rotate by the connecting member.

6. The production line of claim 5, wherein the connecting member comprises:

a first gear connected with the first wiper head;

a second gear connected with the second wiper head; and a third gear connected with the third driving member and engaged with each of the first gear and the second gear.

7. The production line of claim 1, wherein the detecting device comprises:

a circular light source, a center axis of the circular light source is perpendicular to the component;

a first charge coupled device (CCD) camera for capturing a first image based on the circular light source;

a backlight source; and a second CCD camera for capturing a second image based on the backlight source; and wherein the detecting device is further for determining whether the component satisfies the cleaning standard based on the first image and the second image.

8. The production line of claim 1, wherein the pasting device comprises:

a pasting mechanism for attaching the protection film on the component;

a visible locating mechanism being a CCD camera and for obtaining a first position of the component;

a compensating mechanism connected with the pasting mechanism, the compensating mechanism is for compensating the first position of the component based on a specified position; and a pressure keeping mechanism arranged adjacent to the pasting mechanism and for applying a pressure on the protection film pasted on the component.

* * * * *